(12) United States Patent
Akiyama

(10) Patent No.: US 10,996,551 B2
(45) Date of Patent: May 4, 2021

(54) LIGHT SOURCE DEVICE, ILLUMINATION OPTICAL DEVICE, AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/004,066

(22) Filed: Aug. 27, 2020

(65) Prior Publication Data
US 2021/0063864 A1 Mar. 4, 2021

(30) Foreign Application Priority Data
Aug. 28, 2019 (JP) .............................. JP2019-155530

(51) Int. Cl.
*G03B 33/12* (2006.01)
*G03B 21/00* (2006.01)
*G03B 21/20* (2006.01)

(52) U.S. Cl.
CPC ........... *G03B 33/12* (2013.01); *G03B 21/006* (2013.01); *G03B 21/208* (2013.01); *G03B 21/2053* (2013.01); *G03B 21/2066* (2013.01); *G03B 21/2073* (2013.01)

(58) Field of Classification Search
CPC .. G03B 33/12; G03B 21/006; G03B 21/2053; G03B 21/2066; G03B 21/2073; G03B 21/208
USPC .......................................................... 353/31
See application file for complete search history.

(56) References Cited

U.S. PATENT DOCUMENTS 5,161,042 A    11/1992  Hamada

FOREIGN PATENT DOCUMENTS

JP        H04-060538 A    2/1992

*Primary Examiner* — Jerry L Brooks
(74) *Attorney, Agent, or Firm* — Oliff PLC

(57) ABSTRACT

A light source device configured to emit a light beam in a first direction emits a first colored light beam from a first exit position, a second colored light beam longer in wavelength than the first colored light beam, a third colored light beam shorter in wavelength than the first colored light beam, and a fourth colored light beam, a mixed light beam including the first colored light beam and the second colored light beam enters an outgoing light switching device disposed in a light path of the fourth colored light beam.

9 Claims, 9 Drawing Sheets

LIGHT SOURCE DEVICE, ILLUMINATION OPTICAL DEVICE, AND PROJECTOR The present application is based on, and claims priority from JP Application Serial Number 2019-155530, filed Aug. 28, 2019, the disclosure of which is hereby incorporated by reference herein in its entirety.

BACKGROUND

1. Technical Field

The present disclosure relates to a light source device, an illumination optical device, and a projector.

2. Related Art

In the past, there has been known a projector which modulates light beams emitted from a light source to form an image corresponding to image information, and then projects the image thus formed. As such a projector, there has been known a single-panel projector which spatially separates the light beam emitted from a white light source into a plurality of colored light beams, and then makes the colored light beams thus separated respectively enter the corresponding sub-pixels to thereby perform color display (see, e.g., JP-A-4-60538 (Document 1)).

In the projector described in Document 1, a red-light reflecting dichroic mirror, a green-light reflecting dichroic mirror, and a blue-light reflecting dichroic mirror are arranged along the incident light axis of the light beam emitted from the light source in a state of being nonparallel to each other. Thus, the light beam emitted from the light source is separated into a red light beam, a green light beam, and a blue light beam having respective proceeding directions slightly different from each other on the same plane. The red light beam, the green light beam, and the blue light beam thus separated are each collected by a microlens disposed on the incident side of a light modulation element, and then respectively enter red sub-pixels, green sub-pixels, and blue sub-pixels of the light modulation element in the spatially separated state.

In recent years, it has been proposed to make a yellow light beam enter a light modulation device in addition to the red light beam, the green light beam, and the blue light beam, and to increase the luminance of an image to be projected by making these colored light beam enter the light modulation device.

Further, it has been proposed that a liquid crystal display element provided with a plurality of pixels each having one sub-pixel for modulating the red light beam, one sub-pixel for modulating the blue light beam, and two sub-pixels for modulating the green light beam is adopted as the light modulation device, and the color gamut of the projection image is increased by expanding a light emitting area of the green light beam having a wavelength at which human eyes are sensitive to the luminance in one pixel.

However, in the configuration of the proposal described above, the color balance of the image fails to become an appropriate balance in some cases depending on the image to be formed in the light modulation device, and in addition, fails to become a color balance desired by the user in some cases.

Due to such a problem, there has been demanded a light source device capable of switching the colored light beam to be emitted.

SUMMARY

A light source device according to a first aspect of the present disclosure is a light source device configured to emit a light beam in a first direction including a first exit position from which a first colored light beam is emitted, a second exit position which is located at a second direction side of the first exit position, and from which a second colored light beam longer in wavelength than the first colored light beam is emitted, a third exit position which is located at a third direction side of the first exit position, and from which a third colored light beam shorter in wavelength than the first colored light beam is emitted, a fourth exit position which is located at the second direction side of the third exit position, and from which a fourth colored light beam is emitted, and an outgoing light switching device which is disposed in a light path of the fourth colored light beam, and switches a light beam to be emitted as the fourth colored light beam, wherein the second direction and the third direction are perpendicular to the first direction, and are perpendicular to each other, a mixed light beam including a light beam in a wavelength band of the first colored light beam and a light beam in a wavelength band of the second colored light beam enters the outgoing light switching device, and the outgoing light switching device switches between a first state of emitting a whole of the mixed light beam entering the outgoing light switching device, a second state of emitting a part of the mixed light beam entering the outgoing light switching device, and a third state of emitting either one of a colored light beam in the wavelength band of the first colored light beam included in the mixed light beam entering the outgoing light switching device and a colored light beam in the wavelength band of the second colored light beam included in the mixed light beam entering the outgoing light switching device.

In the first aspect described above, the outgoing light switching device may include at least either one of a partial reflection element and a wavelength-selective reflection element, the partial reflection element may be disposed so as to retractably be inserted in the light path of the fourth colored light beam, may reflect a part of the mixed light beam entering the partial reflection element, and may emit another part of the mixed light beam entering the partial reflection element as the fourth colored light beam, and the wavelength-selective reflection element may be disposed so as to retractably be inserted in the light path of the fourth colored light beam, may transmit one colored light beam out of a colored light beam in the wavelength band of the first colored light beam included in the mixed light beam entering the wavelength-selective reflection element and a colored light beam in the wavelength band of the second colored light beam included in the mixed light beam entering the wavelength-selective reflection element, and may reflect the other colored light beam to thereby emit the one colored light beam as the fourth colored light beam.

In the first aspect described above, the partial reflection element may be a half mirror configured to transmit the mixed light beam entering the partial reflection element at a predetermined rate, and the wavelength-selective reflection element may be a dichroic mirror configured to transmit the one colored light beam and reflect the other colored light beam.

In the first aspect described above, the light source device may further include a mode control section, wherein the outgoing light switching device may include the partial reflection element, the wavelength-selective reflection element, and a drive section configured to retractably insert the partial reflection element and the wavelength-selective reflection element in the light path of the fourth colored light beam, and the mode control section may make the drive section eliminate the partial reflection element and the wavelength-selective reflection element from the light path of the fourth colored light beam when a first mode of setting the outgoing light switching device in the first state is set as an operation mode, eliminate the wavelength-selective reflection element from the light path of the fourth colored light beam and insert the partial reflection element in the light path of the fourth colored light beam when a second mode of setting the outgoing light switching device in the second state is set as the operation mode, and eliminate the partial reflection element from the light path of the fourth colored light beam and insert the wavelength-selective reflection element in the light path of the fourth colored light beam when a third mode of setting the outgoing light switching device in the third state is set as the operation mode.

In the first aspect described above, the light source device may further include a light source section configured to emit a source light beam, a first polarization split element configured to transmit a first polarization component of the source light beam in the third direction, and reflect a second polarization component of the source light beam in an opposite direction to the first direction out of the source light beam entering the first polarization split element along the third direction, a second polarization split element located at the third direction side of the first polarization split element, and configured to reflect the first polarization component of the source light beam entering the second polarization split element in the third direction toward the opposite direction to the first direction, a first reflecting element located in the opposite direction side to the first direction side of the first polarization split element, and configured to reflect the source light beam entering the first reflecting element toward the first direction, a first retardation element located between the first polarization split element and the first reflecting element in the first direction, and configured to convert a polarization component of the source light beam, a wavelength conversion element located at the opposite direction side to the first direction side of the second polarization split element, and configured to emit a converted light beam as unpolarized light, which is obtained by performing wavelength conversion on the first polarization component of the source light beam entering the wavelength conversion element in the opposite direction to the first direction, toward the first direction, a second retardation element which is a ½ wave plate which is located at the first direction side of the second polarization split element, and which the converted light beam transmitted through the second polarization split element enters, a first color separation element located at the first direction side of the second retardation element, and configured to separate the converted light entering the first color separation element from the second retardation element into the first colored light beam and the second colored light beam, a second color separation element located at the first direction side of the first polarization split element, and configured to separate a light beam entering the second color separation element in the first direction from the first polarization split element into the third colored light beam and the fourth colored light beam, and a third retardation element which is a ½ wave plate located in a light path of the third colored light beam separated by the second color separation element, wherein the second polarization split element may transmit the first polarization component of the converted light beam in the first direction to thereby make the first polarization component enter the second retardation element, and may reflect the second polarization component of the converted light beam toward an opposite direction to the third direction out of the converted light beam entering the second polarization split element in the first direction, the first polarization split element may transmit the first polarization component of the source light beam entering the first polarization split element in the first direction toward the first direction to thereby make the first polarization component enter the second color separation element, and may reflect the second polarization component of the source light beam entering the first polarization split element in the opposite direction to the third direction toward the first direction to thereby make the second polarization component enter the second color separation element, the first color separation element may emit a first color component included in the second polarization component of the converted light beam entering the first color separation element from the second retardation element as the first colored light beam, and may emit a second color component included in the second polarization component of the converted light beam as the second colored light beam, the second color separation element may emit the first polarization component of the source light beam entering the second color separation element from the first polarization split element to the third retardation element as the third colored light beam, and may emit the second polarization component of the converted light beam entering the second color separation element from the first polarization split element as the fourth colored light beam, and the outgoing light switching device may be disposed in the light path of the fourth colored light beam separated by the second color separation element.

In the first aspect described above, the light source device may further include a light intensity ratio control section, wherein the light source section may include a light source, a fourth retardation element configured to convert a part of the second polarization component of the source light beam emitted from the light source into the first polarization component of the source light beam, and a rotating device configured to rotate the fourth retardation element, and the light intensity ratio control section may control a rotational angle of the fourth retardation element by the rotating device to control a ratio between the first polarization component and the second polarization component in the source light beam emitted from the fourth retardation element.

An illumination optical device according to a second aspect of the present disclosure includes the light source device described above, and a homogenization device, wherein the homogenization device includes a pair of multi-lenses configured to divide the light beam entering the pair of multi-lenses from the light source device into a plurality of partial light beams, and a superimposing lens configured to superimpose the plurality of partial light beams entering the superimposing lens from the pair of multi-lenses on a predetermined position.

A projector according to a third aspect of the present disclosure includes the illumination optical device described above, a light modulation device configured to modulate light emitted from the illumination optical device, and a projection optical device configured to project the light beam modulated by the light modulation device, wherein the light modulation device is disposed at the predetermined position.

In the third aspect described above, the light modulation device may include a single liquid crystal panel having a plurality of pixels, and a microlens array which is located at a light incident side of the liquid crystal panel, and has a plurality of microlenses corresponding to the plurality of pixels, the pixels may each include a first sub-pixel, a second sub-pixel, a third sub-pixel, and a fourth sub-pixel, and the plurality of microlenses may make the first colored light beam enter the first sub-pixels, the second colored light beam enter the second sub-pixels, the third colored light beam enter the third sub-pixels, and the fourth colored light beam enter the fourth sub-pixels.

DESCRIPTION OF AN EXEMPLARY EMBODIMENT

An embodiment of the present disclosure will hereinafter be described based on the drawings.

Schematic Configuration of Projector

Figure 1:
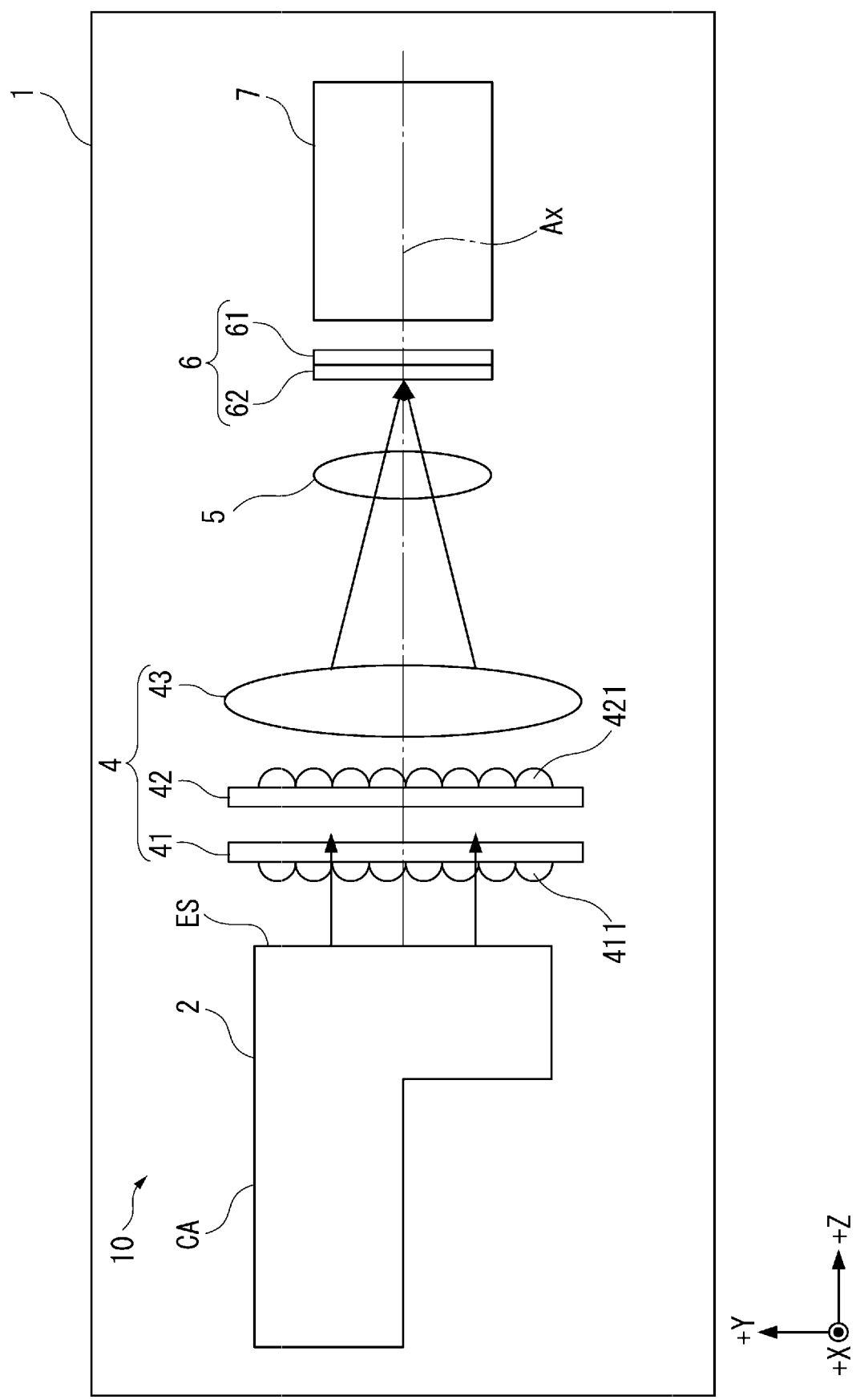
FIG. 1 is a schematic diagram showing an internal configuration of a projector in an embodiment.

FIG. 1 is a schematic diagram showing an internal configuration of a projector 1 according to the present embodiment.

The projector 1 according to the present embodiment is for modulating the light beams emitted from a light source device 2 to form an image corresponding to image information, and then projecting the image thus formed on a projection target surface such as a screen in an enlarged manner. Specifically, the projector 1 is a so-called single-panel projector, and modulates the light beams emitted from the light source device 2 with a single light modulation device 6 having a single liquid crystal panel 61 to thereby form the image, and then projects the image thus formed.

As shown in FIG. 1, the projector 1 is provided with the light source device 2, a homogenization device 4, a field lens 5, the light modulation device 6, and a projection optical device 7, wherein these constituents are disposed at predetermined positions on an illumination light axis Ax preset in the projector 1.

It should be noted that the light source device 2 and the homogenization device 4 constitute an illumination optical device 10 for illuminating an image formation area in the light modulation device 6.

Schematic Configuration of Light Source Device

The light source device 2 emits a plurality of colored light beams which are each the same linearly polarized light beam, and are spatially separated from each other. Specifically, the light source device 2 emits a first colored light beam, a second colored light beam, a third colored light beam, and a fourth colored light beam, which are linearly polarized light beams polarized in the same polarization direction, from respective exit positions different from each other. In the present embodiment, the light source device 2 emits a green light beam as the first colored light beam, a red light beam as the second colored light beam, a blue light beam as the third colored light beam, and a yellow light beam or a green light beam as the fourth colored light beam.

The light source device 2 has a chassis CA as a light source device chassis for housing optical components constituting the light source device 2 inside. The colored light beams to be emitted from the light source device 2 are emitted from an exit surface ES opposed to the homogenization device 4 in the chassis CA.

It should be noted that a configuration of the light source device 2 will be described later in detail.

In the following description, a direction in which the light source device 2 emits the light beams along the illumination light axis Ax is defined as a +Z direction, and two directions perpendicular to the +Z direction and perpendicular to each other are defined as a +X direction and a +Y direction. In these directions, the +Y direction is defined as an upper direction in the projector 1. Further, the +X direction is defined as a right-hand direction when viewing an object which the light enters along the +Z direction so that the +Y direction points the upper side. Although not shown in the drawings, an opposite direction to the +X direction is defined as a −X direction, an opposite direction to the +Y direction is defined as a −Y direction, and an opposite direction to the +Z direction is defined as a −Z direction.

It should be noted that the +Z direction corresponds to a first direction, the −Y direction corresponds to a second direction, and the −X direction corresponds to a third direction.

Configuration of Homogenization Device

The homogenization device 4 homogenizes the illuminance in the light modulation device 6 illuminated by the light beams emitted from the light source device 2. The homogenization device 4 has two multi-lenses 41, 42 and a superimposing lens 43.

The multi-lens 41 has a plurality of lenses 411 arranged in a matrix in a plane perpendicular to a central axis of a light flux entering the multi-lens 41 from the light source device 2. In other words, the multi-lens 41 has a plurality of lenses 411 arranged in a matrix in a plane perpendicular to the illumination light axis Ax parallel to the +Z direction. The multi-lens 41 divides each of the colored light beams entering the multi-lens 41 from the light source device 2 into a plurality of partial light beams with the lenses 411.

Figure 2:
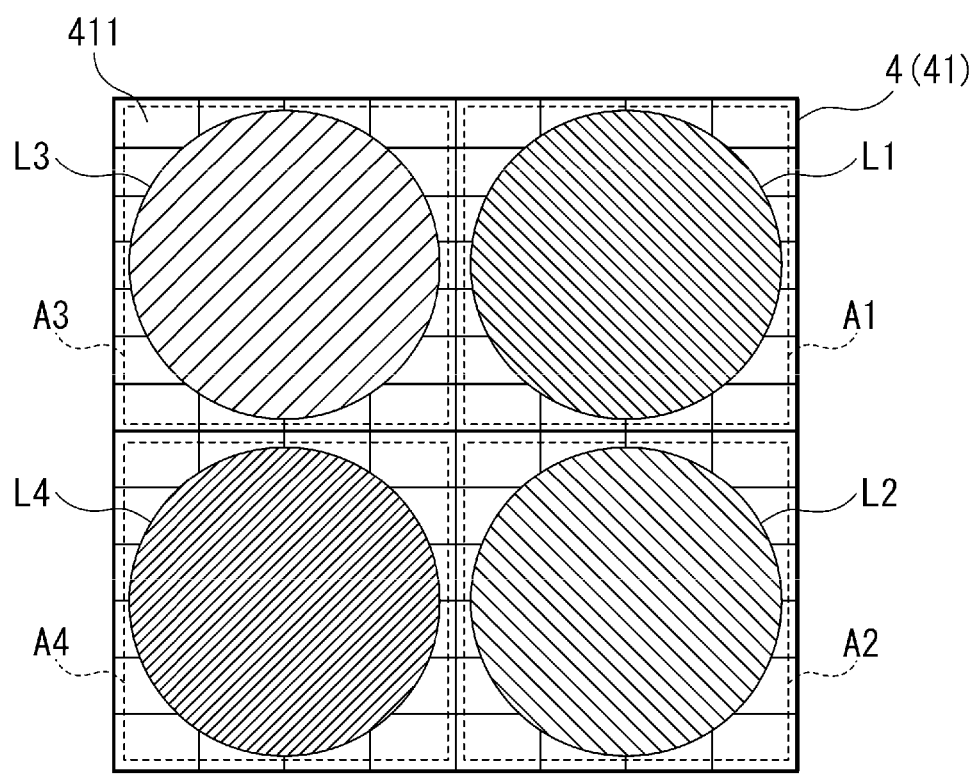
FIG. 2 is a schematic diagram showing incident positions of colored light beams in a multi-lens in the embodiment.
Figure 2:
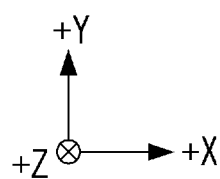

FIG. 2 is a schematic diagram of the multi-lens 41 viewed from the −Z direction as a light incident side. In other words, FIG. 2 is a schematic diagram showing incident positions of the respective colored light beams emitted from the light source device 2 in the multi-lens 41.

Specifically, the first through fourth colored light beams L1 through L4 each emitted from the light source device 2 enter the multi-lens 41 as shown in FIG. 2.

The first colored light beam L1 enters an area A1 located at the +X direction side and the +Y direction side in the multi-lens 41. The second colored light beam L2 enters an area A2 located at the +X direction side and the −Y direction side in the multi-lens 41. The third colored light beam L3 enters an area A3 located at the −X direction side and the +Y direction side in the multi-lens 41. The fourth colored light beam L4 enters an area A4 located at the −X direction side and the −Y direction side in the multi-lens 41.

The colored light beams having entered the areas A1 through A4 are each divided into a plurality of partial light beams by the plurality of lenses 411 disposed in each of the areas, and the partial light beams thus divided into enter corresponding lenses 421 in the multi-lens 42.

As shown in FIG. 1, the multi-lens 42 has the plurality of lenses 421 corresponding respectively to the plurality of lenses 411, and the partial light beam emitted from corresponding one of the lenses 411 enters each of the lenses 421. Each of the lenses 421 makes the partial light beam, which has entered the lens 421, enter the superimposing lens 43.

The superimposing lens 43 superimposes the plurality of partial light beams entering the superimposing lens 43 from the multi-lens 42 on the light modulation device 6. In other words, the predetermined position where the superimposing lens 43 superimposes the plurality of partial light beams is the arrangement position of the light modulation device 6. The multi-lens 42 and the superimposing lens 43 make the first colored light beam L1, the second colored light beam L2, the third colored light beam L3, and the fourth colored light beam L4 each divided into the plurality of partial light beams enter a plurality of microlenses 621 constituting a microlens array 62 described later of the light modulation device 6 at respective angles different from each other via the field lens 5.

Configuration of Field Lens

The field lens 5 is disposed between the homogenization device 4 and the light modulation device 6 in the +Z direction. The field lens 5 makes the whole of the light flux, which enters the light modulation device 6 from the light source device 2 via the homogenization device 4, telecentric.

Configuration of Light Modulation Device

The light modulation device 6 is provided alone to the projector 1. The light modulation device 6 modulates the light beams emitted from the light source device 2 to form the image corresponding to the image information. Specifically, the light modulation device 6 modulates each of the colored light beams which are emitted from the illumination optical device 10, and then enter the light modulation device 6 via the field lens 5 to form the image corresponding to the image information.

The light modulation device 6 is provided with the liquid crystal panel 61 and the microlens array 62.

Configuration of Liquid Crystal Panel

Figure 3:
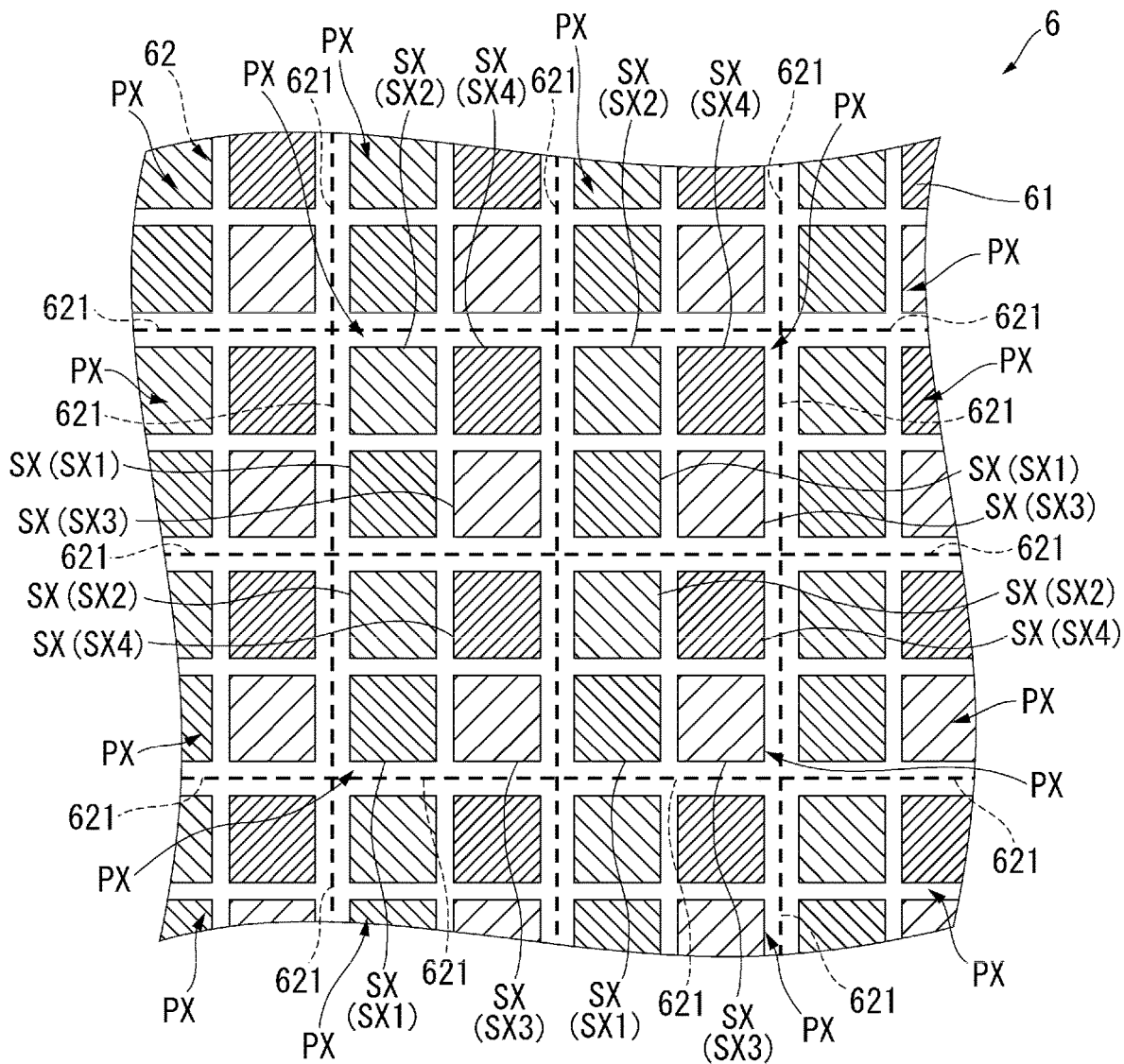
FIG. 3 is a schematic diagram showing, in an enlarged manner, a part of a light modulation device in the embodiment.

FIG. 3 is a schematic diagram showing, in an enlarged manner, a part of the light modulation device 6 viewed from the −Z direction as the light incident side. In other words, FIG. 3 is a schematic diagram showing a correspondence relationship between the pixels PX provided to the liquid crystal panel 61 and the microlenses 621 provided to the microlens array 62.

As shown in FIG. 3, the liquid crystal panel 61 has the plurality of pixels PX arranged in a matrix in an orthogonal plane with respect to the illumination light axis Ax.

Each of the pixels PX has a plurality of sub-pixels SX for respectively modulating corresponding colored light beams. In the present embodiment, each of the pixels PX has four sub-pixels SX1, SX2, SX3, and SX4.

Specifically, in one pixel PX, the first sub-pixel SX1 is disposed at a position at the −X direction side and −Y direction side, and the second sub-pixel SX2 is disposed at a position at the −X direction side and +Y direction side. Further, in one pixel PX, the third sub-pixel SX3 is disposed at a position at the +X direction side and −Y direction side, and the fourth sub-pixel SX4 is disposed at a position at the +X direction side and +Y direction side.

Configuration of Microlens Array

The microlens array 62 is disposed on the −Z direction side as the light incident side with respect to the liquid crystal panel 61, and guides the colored light beams entering the microlens array 62 to the corresponding sub-pixels SX. The microlens array 62 has the plurality of microlenses 621 corresponding to the plurality of pixels PX.

The plurality of microlenses 621 is arranged in a matrix in an orthogonal plane with respect to the illumination light axis Ax.

The first colored light beam L1, the second colored light beam L2, the third colored light beam L3, and the fourth colored light beam L4, which are each the plurality of partial light beams, are superimposed on each of the microlenses 621 by the homogenization device 4, and the colored light beams enter each of the microlenses 621 at respective angles different from each other. Each of the microlenses 621 makes each of the colored light beams entering the microlens 621 enter the corresponding sub-pixel SX.

In the present embodiment, one microlens 621 is disposed so as to correspond to one pixel PX. In other words, the one microlens 621 is disposed so as to correspond to the four sub-pixels SX1 through SX4 constituting the one pixel PX. The microlenses 621 each guide the first colored light beam L1 to the first sub-pixel SX1 out of the sub-pixels SX of the corresponding pixel PX, and each guide the second colored light beam L2 to the second sub-pixel SX2. Further, the microlenses 621 each guide the third colored light beam L3 to the third sub-pixel SX3, and each guide the fourth colored light beam L4 to the fourth sub-pixel SX4.

Thus, the colored light beams L1 through L4 respectively enter the corresponding sub-pixels SX1 through SX4, and the colored light beams L1 through L4 are respectively modulated by the corresponding sub-pixels SX1 through SX4. Such a modulation of the incident colored light beams by the sub-pixels SX1 through SX4 is performed in each of the pixels PX of the liquid crystal panel 61.

Configuration of Projection Optical Device

The projection optical device 7 projects the light beams modulated by the light modulation device 6. Specifically, the projection optical device 7 projects the image, which is formed by the liquid crystal panel 61 modulating the colored light beams having entered the projection optical device 7, on the projection target surface not shown. As such a projection optical device 7, there can be adopted a combination lens having a mirror tube and at least one lens disposed in the mirror tube.

Detailed Configuration of Light Source Device

Figure 4:
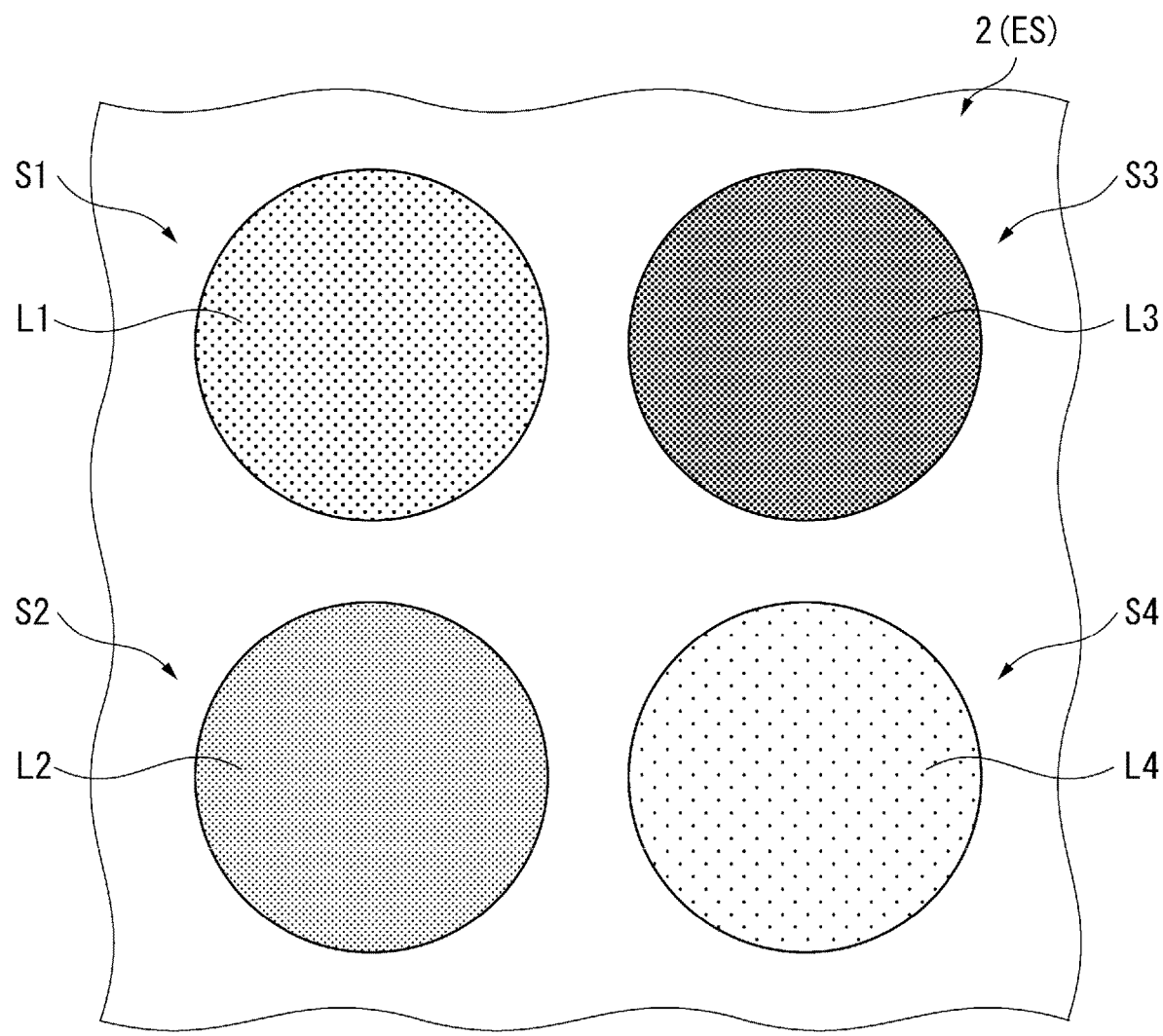
FIG. 4 is a diagram showing exit positions of respective colored light beams emitted from a light source device in the embodiment.

FIG. 4 is a diagram showing exit positions of the plurality of colored light beams L1 through L4 emitted from the light source device 2. In other words, FIG. 4 is a diagram of the exit surface ES of the light source device 2 viewed from the +Z direction.

The light source device 2 emits the light beams for illuminating the light modulation device 6 in the +Z direction. As described above, the light beams emitted by the light source device 2 are the linearly polarized light beams with the uniform polarization direction, and the light source device 2 emits the first colored light beam L1, the second colored light beam L2, the third colored light beam L3, and the fourth colored light beam L4 spatially separated from each other.

Specifically, as shown in FIG. 4, the light source device 2 emits the first colored light beam L1 from a first exit position S1 in the exit surface ES as a surface on the +Z direction side in the chassis CA. The light source device 2 emits the second colored light beam L2 from a second exit position S2 located at the −Y direction side of the first exit position S1 in the exit surface ES. The light source device 2 emits the third colored light beam L3 from a third exit position S3 located at the −X direction side of the first exit position S1 in the exit surface ES. The light source device 2 emits the fourth colored light beam L4 from a fourth exit position S4 located at the −Y direction side of the third exit position S3 in the exit surface ES. It should be noted that as described above, the first colored light beam L1 is the green light beam, the second colored light beam L2 is the red light beam, the third colored light beam is the blue light beam, and the fourth colored light beam is one of the yellow light beam and the green light beam.

Hereinafter, the configuration of the light source device 2 will be described in detail.

Figure 5:
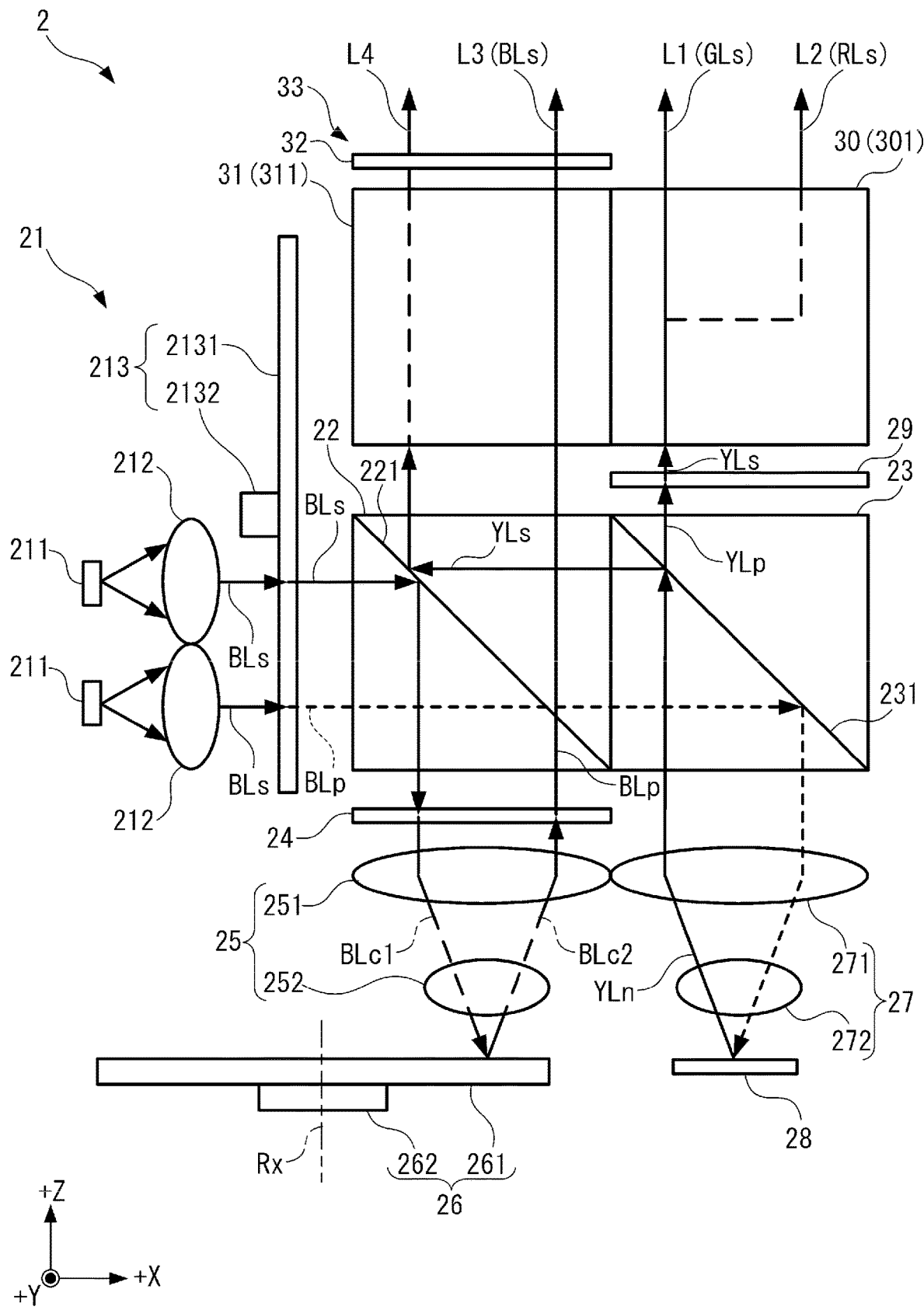
FIG. 5 is a schematic diagram showing a configuration of the light source device in the embodiment.

FIG. 5 is a schematic diagram showing a configuration of the light source device 2. In other words, FIG. 5 is a plan view of the light source device 2 viewed from the +Y direction.

As shown in FIG. 5, the light source device 2 has a light source section 21, a first polarization split element 22, a second polarization split element 23, a first retardation element 24, a first light collection element 25, a first reflecting element 26, a second light collection element 27, a wavelength conversion element 28, a second retardation element 29, a first color separation element 30, a second color separation element 31, a third retardation element 32, and an outgoing light switching device 33. Besides the above, although not shown in FIG. 5, the light source device 2 has a control section 37 (see FIG. 9) for controlling an operation of the light source device 2.

Configuration of Light Source Section

The light source section 21 emits source light beams which enter the first polarization split element 22 along the +X direction. The light source section 21 has light sources 211, collimator lenses 212, and a rotary retardation device 213.

The light source 211 is a solid-state light source for emitting the blue light beam. Specifically, the light sources 211 are each a semiconductor laser for emitting the blue light beam BLs as the s-polarized light to a polarization split layer 221 of the first polarization split element 22 and a polarization split layer 231 of the second polarization split element 23. The blue light beam BLs emitted by the light source 211 is a laser beam having a peak wavelength of, for example, 450 through 460 nm.

The collimator lenses 212 collimate the light beams emitted from the light sources 211, respectively.

The rotary retardation device 213 has a retardation element 2131, and a rotating device 2132 for rotating the retardation element 2131 centering on a rotational axis parallel to the +X direction.

The retardation element 2131 corresponds to a fourth retardation element, and is one of a ½ wave plate and a ¼ wave plate. A part of the blue light beam BLs as the s-polarized light having entered the retardation element 2131 is converted into a blue light beam BLp as p-polarized light while passing through the retardation element 2131. Therefore, the blue light beam having been transmitted through the retardation element 2131 turns to light in which the blue light beam BLs as the original s-polarized light and the blue light beam BLp as the p-polarized light are mixed with each other at a predetermined rate.

Further, by the rotating device 2132 adjusting the rotational angle of the retardation element 2131, the ratio between the blue light beams BLs and the blue light beam BLp included in the blue light beam having been transmitted through the retardation element 2131 is adjusted. It should be noted that the rotating device 2132 for rotating the retardation element 2131 can be eliminated.

As described above, the light source section 21 emits the source light beams including the blue light beam BLp, which is a first polarization component, and is the p-polarized light with respect to the polarization split layer 221 of the first polarization split element 22 and the polarization split layer 231 of the second polarization split element 23, and the blue light beam BLs, which is a second polarization component, and is the s-polarized light with respect to the polarization split layer 221 of the first polarization split element 22 and the polarization split layer 231 of the second polarization split element 23.

It should be noted that the light source 211 has a configuration of emitting the blue light beam BLs as the s-polarized light as described above, but can have a configuration of emitting the blue light beam BLp. Further, it is also possible for the light source 211 to have a configuration of emitting both of the blue light beam BLs and the blue light beam BLp. In this case, the rotary retardation device 213 can be eliminated. Further, it is also possible for the light source 211 to be provided with another solid-state light source such as LED (Light Emitting Diode) instead of the semiconductor laser.

In the following description, when the s-polarized light is mentioned, it means the s-polarized light with respect to the polarization split layer 221 of the first polarization split element 22 and the polarization split layer 231 of the second polarization split element 23. Similarly, when the p-polarized light is mentioned, it means the p-polarized light with respect to the polarization split layer 221 of the first polarization split element 22 and the polarization split layer 231 of the second polarization split element 23.

In the present embodiment, the p-polarized light corresponds to the first polarization component, and the s-polarized light corresponds to the second polarization component.

Configuration of First Polarization Split Element

The blue light beams BLs, BLp as the source light beam enter the first polarization split element 22 along the +X direction.

The first polarization split element 22 is a prism-type polarization split element formed by combining two prism segments each shaped like a substantially isosceles right triangular prism with each other to have a substantially rectangular solid shape, and on the interface between the two prism segments, there is disposed the polarization split layer 221.

The polarization split layer 221 is tilted 45° with respect to the +X direction and the +Z direction. Specifically, the polarization split layer 221 is tilted 45° with respect to the X-Y plane and the Y-Z plane.

The polarization split layer 221 has a polarization split characteristic of transmitting the p-polarized light and reflecting the s-polarized light out of the incident light. Alternatively, the polarization split layer 221 has a wavelength-selective polarization split characteristic of transmitting the p-polarized light and reflecting the s-polarized light when the incident light is the blue light beam while reflecting the incident light irrespective of the polarization state when the incident light is light longer in wavelength than the blue light beam.

Therefore, the first polarization split element transmits the blue light beam BLp, which is the p-polarized light as the first polarization component, toward the +X direction, and reflects the blue light beam BLs, which is the s-polarized light as the second polarization component, toward the −Z direction out of the source light beam entering the first polarization split element 22 in the +X direction.

It should be noted that the first polarization split element 22 is not limited to the prism-type polarization split element, but can be a plate-type polarization split element having the polarization split layer 221.

Configuration of Second Polarization Split Element

The second polarization split element 23 is located at the +X direction side of the first polarization split element 22. The blue light beam BLp having passed through the first polarization split element 22 enters the second polarization split element 23.

Similarly to the first polarization split element 22, the second polarization split element 23 is the prism-type polarization split element, and has the polarization split layer 231 disposed on an interface between two prism segments.

The polarization split layer 231 is tilted 45° with respect to the +X direction and the +Z direction. Specifically, the polarization split layer 231 is tilted 45° with respect to the X-Y plane and the Y-Z plane. Further, the polarization split layer 231 and the polarization split layer 221 are parallel to each other.

The polarization split layer 231 has a wavelength-selective polarization split characteristic of reflecting the blue light beam while reflecting the s-polarized light and transmitting the p-polarized light with respect to the light longer in wavelength than the blue light beam. Therefore, the second polarization split element 23 reflects the blue light beam BLp, which enters the second polarization split element 23 from the first polarization split element 22 in the +X direction, toward the −Z direction.

It should be noted that the second polarization split element 23 is not limited to the prism-type polarization split element, but can be a plate-type polarization split element having the polarization split layer 231.

Configuration of First Retardation Element

The first retardation element 24 is located at the −Z direction side of the first polarization split element 22. In other words, the first retardation element 24 is located between the first polarization split element 22 and the first reflecting element 26 in the +Z direction.

The first retardation element 24 is a ¼ wave plate, and the blue light beam BLs reflected by the first polarization split element 22 is converted by the first retardation element 24 into a blue light beam BLc1 as circularly polarized light, and then enters the first light collection element 25. In other words, the first retardation element 24 converts the polarization state of the blue light beam entering the first retardation element 24.

Configuration of First Light Collection Element

The first light collection element 25 is located at the −Z direction side of the first retardation element 24. In other words, the first light collection element 25 is located between the first retardation element 24 and the first reflecting element 26 in the +Z direction.

The first light collection element 25 converges the blue light beam BLc1 entering the first light collection element 25 from the first retardation element 24 on the first reflecting element 26. Further, the first light collection element 25 collimates a blue light beam BLc2 entering the first light collection element 25 from the first reflecting element 26. It should be noted that although the first light collection element 25 has a configuration including two lenses 251, 252 in the example shown in FIG. 5, the number of the lenses constituting the first light collection element 25 does not matter.

Configuration of First Reflecting Element

The first reflecting element 26 is located at the −Z direction side of the first light collection element 25. In other words, the first reflecting element 26 is located at the −Z direction side of the first polarization split element 22.

The first reflecting element 26 diffusely reflects the blue light beam BLc1, which enters the first reflecting element 26 from the first light collection element 25 in the −Z direction, toward the +Z direction. The first reflecting element 26 is provided with a reflecting plate 261 for reflecting the blue light beam BLc1 having entered the reflecting plate 261, and a rotating section 262 for rotating the reflecting plate 261 centering on a rotational axis Rx parallel to the +Z direction.

The blue light beam BLc1 having entered the reflecting plate 261 is converted into the blue light beam BLc2 as circularly polarized light with an opposite rotational direction when being reflected by the reflecting plate 261.

The blue light beam BLc2 emitted from the first reflecting element 26 is collimated while passing through the first light collection element 25 in the +Z direction, and then enters the first retardation element 24 once again. Therefore, the blue light beam BLc2 entering the first retardation element 24 from the first light collection element 25 is converted by the first retardation element 24 not into the blue light beam BLs as the s-polarized light which enters the first retardation element 24 from the first polarization split element 22, but into the blue light beam BLp as the p-polarized light. The blue light beam BLp thus converted is transmitted through the first polarization split element 22 in the +Z direction, and then enters the second color separation element 31.

Configuration of Second Light Collection Element

The second light collection element 27 is located at the −Z direction side of the second polarization split element 23. In other words, the second light collection element 27 is located between the second polarization split element 23 and the wavelength conversion element 28 in the +Z direction.

The second light collection element 27 converges the blue light beam BLp reflected toward the −Z direction by the second polarization split element 23 on the wavelength conversion element 28. Further, the second light collection element 27 collimates the yellow light beam YLn entering the second light collection element 27 from the wavelength conversion element 28. It should be noted that although the second light collection element 27 has a configuration including two lenses 271, 272 in the example shown in FIG. 5, the number of the lenses constituting the second light collection element 27 does not matter.

Configuration of Wavelength Conversion Element

The wavelength conversion element 28 is located at the −Z direction side of the second light collection element 27. In other words, the wavelength conversion element 28 is located at the −Z direction side of the second polarization split element 23.

The wavelength conversion element 28 is excited by the incident light, and emits a converted light beam as light having a wavelength different from the wavelength of the incident light. Specifically, the wavelength conversion element 28 is a reflective wavelength conversion element for emitting the converted light beam toward the opposite direction to the incident direction of the light. In other words, the wavelength conversion element 28 emits the converted light beam obtained by converting the wavelength of the incident light toward the opposite direction to the incident direction of the light.

In the present embodiment, the wavelength conversion element 28 includes a yellow phosphor which is excited by the blue light beam to emit the yellow light beam, and the wavelength conversion element 28 emits the yellow light beam YLn, which is fluorescence having a wavelength longer than the wavelength of the blue light beam BLp entering the wavelength conversion element 28 in the −Z direction, toward the +Z direction as the converted light beam.

The yellow light beam YLn is light having a peak wavelength in a range of, for example, 500 nm through 700 nm, and is unpolarized light. In other words, the yellow light beam YLn is light including a green light component as a first color component and a red light component as a second color component, wherein the s-polarized light and the p-polarized light are mixed with each other in each of the components.

It should be noted that the light source device 2 can be provided with a rotating device for rotating the wavelength conversion element 28 centering on a rotational axis parallel to the +Z direction. In this case, it is possible to increase the heat radiation efficiency of the wavelength conversion element 28.

The yellow light beam YLn emitted toward the +Z direction from the second light collection element 27 enters the second polarization split element 23.

The polarization split layer 231 of the second polarization split element 23 has the wavelength-selective polarization split characteristic as described above. Therefore, out of the yellow light beam YLn having entered the polarization split layer 231, the yellow light beam YLs as the s-polarized light is reflected toward the −X direction by the polarization split layer 231, and then enters the first polarization split element 22. The polarization split layer 221 of the first polarization split element 22 has the polarization split characteristic of reflecting the yellow light beam YLs as the s-polarized light as described above. Therefore, the yellow light beam YLs having entered the polarization split layer 221 in the −X direction is reflected toward the +Z direction by the first polarization split element 22, and then enters the second color separation element 31.

In contrast, out of the yellow light beam YLn having entered the polarization split layer 231, the yellow light beam YLp as the p-polarized light is transmitted toward the +Z direction through the polarization split layer 231, and then enters the second retardation element 29.

Configuration of Second Retardation Element

The second retardation element 29 is located at the +Z direction side of the second polarization split element 23. The yellow light beam YLp having been transmitted through the second polarization split element 23 toward the +Z direction enters the second retardation element 29.

The second retardation element 29 is a ½ wave plate for converting the yellow light beam YLp having entered the second retardation element 29 into the yellow light beam YLs as the s-polarized light. The yellow light beam YLs thus converted enters the first color separation element 30.

Configuration of First Color Separation Element

Figure 6:
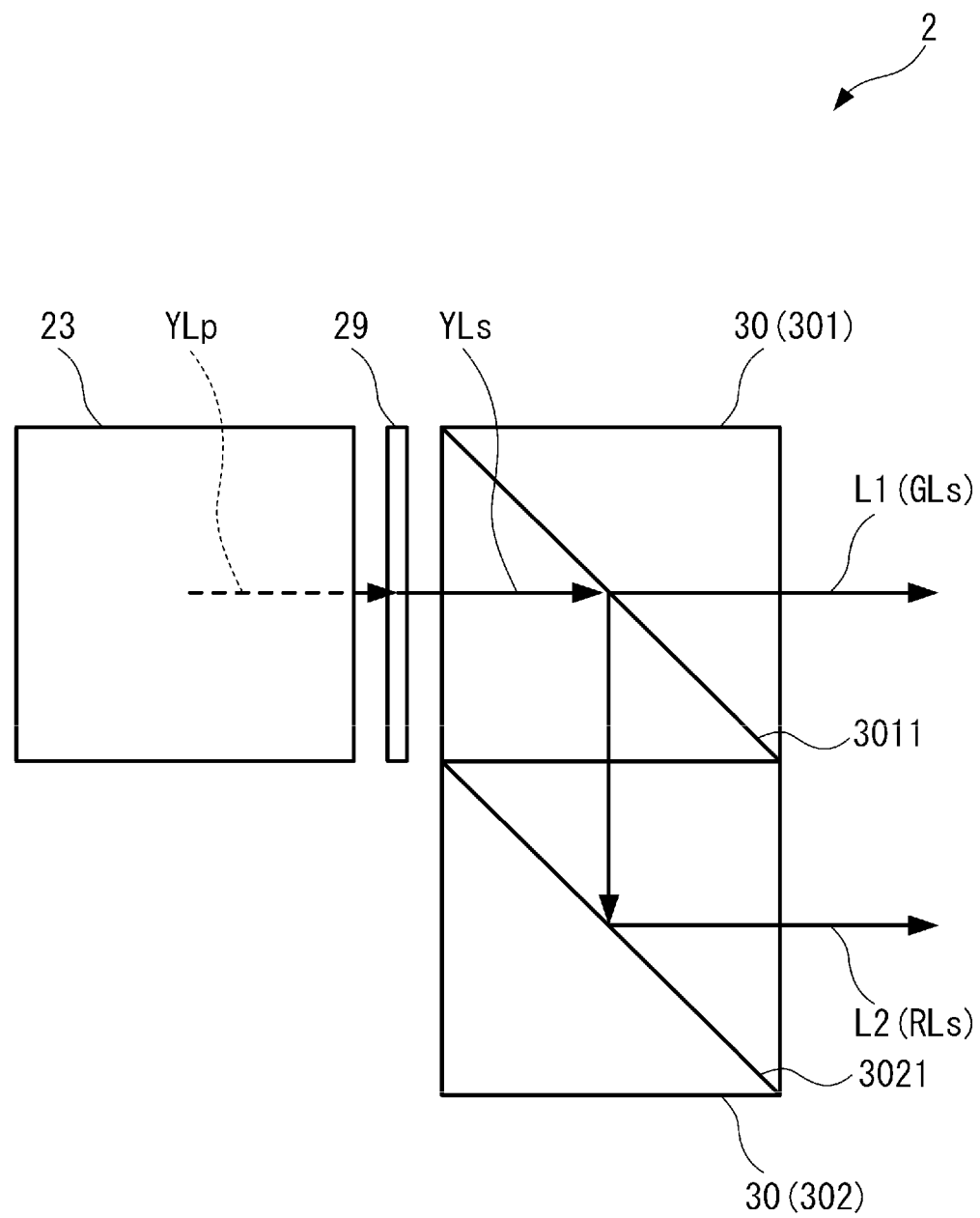
FIG. 6 is a schematic diagram of the light source device in the embodiment viewed from a +X direction.

FIG. 6 is a schematic diagram of the light source device 2 viewed from the +X direction. In other words, FIG. is a schematic diagram of the first color separation element 30 viewed from the +X direction. It should be noted that in FIG. 6, illustration of the second light collection element 27 and the wavelength conversion element 28 is omitted.

As shown in FIG. 5 and FIG. 6, the first color separation element 30 is located at the +Z direction side of the second retardation element 29. The first color separation element 30 separates the green light component as the first color component and the red light component as the second color component from the yellow light beam YLs entering the first color separation element 30 from the second retardation element 29.

As shown in FIG. 6, the first color separation element 30 has a dichroic prism 301 and a reflecting prism 302.

The dichroic prism 301 is a prism-type color separation element formed by combining two prism segments each shaped like a substantially isosceles right triangular prism with each other to have a substantially rectangular solid shape, and on the interface between the two prism segments, there is disposed a color separation layer 3011.

The color separation layer 3011 is tilted 45° with respect to the +Y direction and the +Z direction. Specifically, the color separation layer 3011 is tilted 45° with respect to the X-Y plane and the X-Z plane.

The color separation layer 3011 transmits the green light component toward the +Z direction and reflects the red light component toward the −Y direction out of the incident light. Therefore, the green light beam GLs which is the green light component as the s-polarized light out of the yellow light beam YLs having entered the dichroic prism 301 is transmitted through the color separation layer 3011 toward the +Z direction to be emitted outside the dichroic prism 301. Then, the green light beam GLs is emitted from the light source device 2 toward the +Z direction as the first colored light beam L1, and then enters the homogenization device 4.

In contrast, the red light beam RLs which is the red light component as the s-polarized light out of the yellow light beam YLs having entered the dichroic prism 301 is reflected toward the −Y direction by the color separation layer 3011.

It should be noted that it is possible to adopt a dichroic mirror having the color separation layer 3011 instead of the dichroic prism 301.

The reflecting prism 302 is a prism-type reflecting element formed by combining two prism segments each shaped like a substantially isosceles right triangular prism with each other to have a substantially rectangular solid shape, and on the interface between the two prism segments, there is disposed a reflecting layer 3021 parallel to the color separation layer 3011.

The reflecting layer 3021 reflects the red light beam RLs, which enters the reflecting layer 3021 in the −Y direction from the color separation layer 3011, toward the +Z direction. The red light beam RLs having been reflected by the reflecting layer 3021 is emitted outside the reflecting prism 302. Then, the red light beam RLs is emitted from the light source device 2 toward the +Z direction as the second colored light beam L2, and then enters the homogenization device 4. In other words, the red light beam RLs is emitted as the second colored light beam L2 from the second exit position S2 located at the −Y direction side of the first exit position S1 from which the green light GLs as the first colored light beam L1 is emitted.

Configuration of Second Color Separation Element

Figure 7:
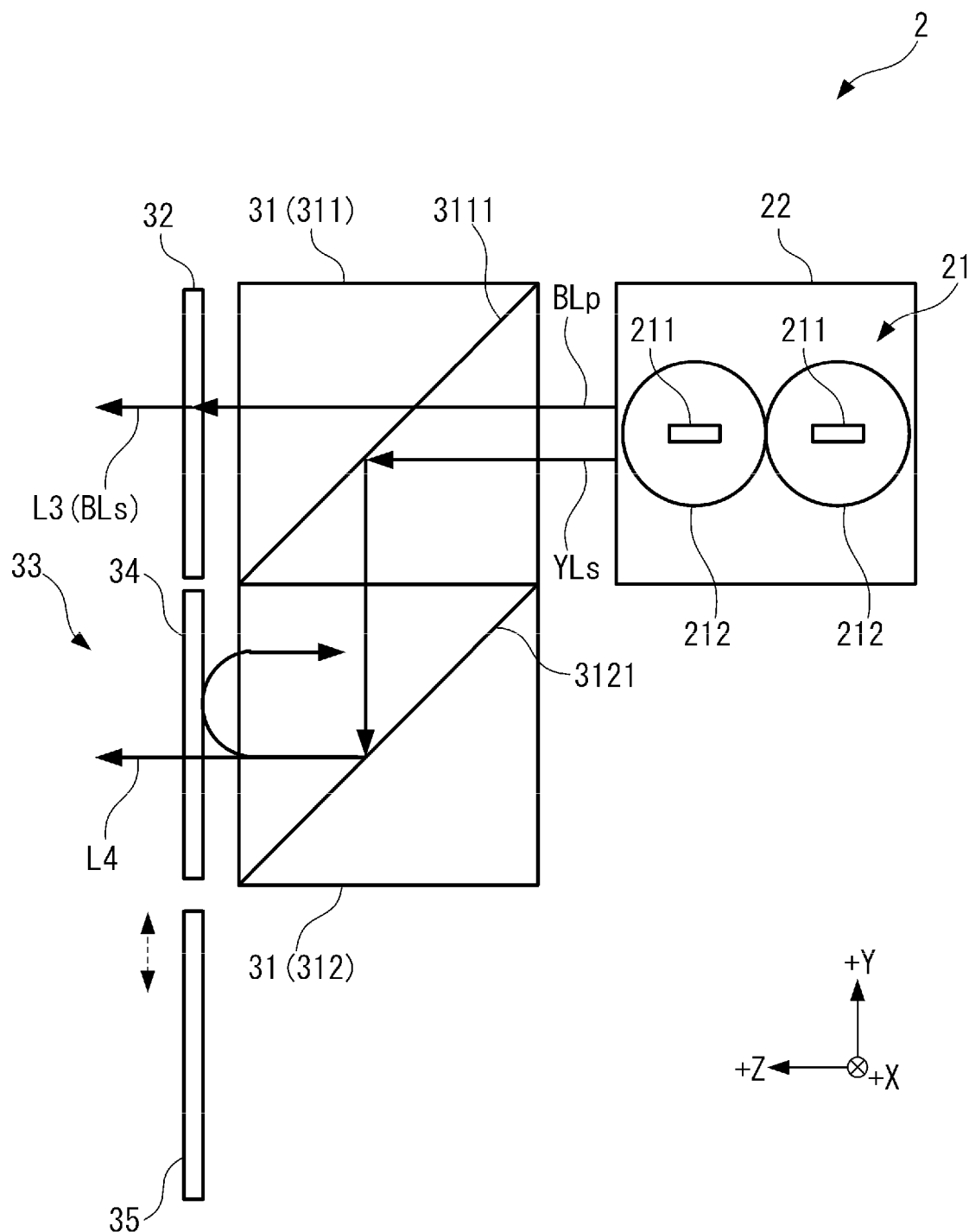
FIG. 7 is a schematic diagram of the light source device in the embodiment viewed from a −X direction.

FIG. 7 is a schematic diagram of the light source device 2 viewed from the −X direction. In other words, FIG. is a schematic diagram of the second color separation element 31, the third retardation element 32, and the outgoing light switching device 33 viewed from the −X direction. It should be noted that in FIG. 7, illustration of the rotary retardation device 213, the first retardation element 24, the first light collection element 25, and the first reflecting element 26 is omitted.

The second color separation element 31 is located at the +Z direction side of the first polarization split element 22, and separates the blue light beam BLp and the yellow light beam YLs from the light entering the second color separation element 31 from the first polarization split element 22. As shown in FIG. 7, the second color separation element 31 has a dichroic prism 311 and a reflecting prism 312.

The blue light beam BLp and the yellow light beam YLs having been emitted from the first polarization split element 22 enter the dichroic prism 311. The dichroic prism 311 is a prism-type color separation element similar to the dichroic prism 301, and on the interface between the two prism segments, there is disposed a color separation layer 3111.

The color separation layer 3111 is tilted 45° with respect to the +Y direction and the +Z direction. Specifically, the color separation layer 3111 is tilted 45° with respect to the X-Y plane and the X-Z plane.

The color separation layer 3111 has a property of transmitting the blue light beam out of the incident light toward the +Z direction, and reflecting the colored light beams longer in wavelength than the blue light beam toward the −Y direction. Therefore, the blue light beam BLp as the first polarization component of the source light beam out of the light beam having entered the dichroic prism 311 from the first polarization split element 22 is transmitted through the color separation layer 3111 toward the +Z direction to be emitted outside the dichroic prism 311. The blue light beam BLp enters the third retardation element 32.

In contrast, the yellow light beam YLs out of the light beam having entered the dichroic prism 311 from the first polarization split element 22 is reflected toward the −Y direction by the color separation layer 3111.

It should be noted that it is possible to adopt a dichroic mirror having the color separation layer 3111 instead of the dichroic prism 311.

The reflecting prism 312 is located at the −Y direction side of the dichroic prism 311. The yellow light beam YLs reflected by the color separation layer 3111 enters the reflecting prism 312.

The reflecting prism 312 has substantially the same configuration as that of the reflecting prism 302, and on the interface between the two prism segments, there is disposed a reflecting layer 3121.

The reflecting layer 3121 is tilted 45° with respect to the +Y direction and the +Z direction. Specifically, the reflecting layer 3121 is tilted 45° with respect to the X-Y plane and the X-Z plane. In other words, the reflecting layer 3121 is parallel to the color separation layers 3011, 3111 and the reflecting layer 3021.

The reflecting layer 3121 reflects the yellow light beam YLs, which is a second polarized light component of the converted light beam entering the reflecting layer 3121 in the −Y direction from the dichroic prism 311, toward the +Z direction. The yellow light beam YLs having been reflected by the reflecting layer 3121 is emitted from the reflecting prism 312 toward the +Z direction, and then enters the outgoing light switching device 33.

It should be noted that it is possible to adopt a reflecting mirror having the reflecting layer 3121 instead of the reflecting prism 312.

Configuration of Third Retardation Element

The third retardation element 32 is disposed on the +Z direction side of the dichroic prism 311, and is located in the light path of the blue light beam BLp emitted from the dichroic prism 311. The third retardation element is a ½ wave plate for conversing the polarization direction of the incident light, and converts the blue light beam BLp having entered the third retardation element 32 from the dichroic prism 311 into the blue light beam BLs as the s-polarized light.

The blue light beam BLs having been converted by the third retardation element 32 into the s-polarized light is emitted from the light source device 2 toward the +Z direction as the third colored light beam L3, and then enters the homogenization device 4. In other words, the blue light beam BLs having been transmitted through the third retardation element 32 is emitted from the third exit position S3 as the third colored light beam L3.

It should be noted that the third retardation element 32 can be disposed on a surface from which the blue light beam BLp is emitted in the dichroic prism 311.

Outgoing Light Switching Device

The yellow light beam YLs as a mixed light beam including light in the wavelength band of the first colored light beam L1 and light in the wavelength band of the second colored light beam L2 enters the outgoing light switching device 33, and the outgoing light switching device 33 switches the colored light beam to be emitted as the fourth colored light beam L4. In the present embodiment, the outgoing light switching device 33 switches between when the yellow light beam YLs entering the outgoing light switching device 33 from the second color separation element 31 is directly emitted as the fourth colored light beam L4, when a part of the yellow light beam YLs entering the outgoing light switching device 33 from the second color separation element 31 is emitted as the fourth colored light beam L4, and when the green light GLs as light in the wavelength band of the first colored light beam L1 included in the yellow light beam YLs entering the outgoing light switching device 33 from the second color separation element 31 is emitted.

The outgoing light switching device 33 has a second reflecting element 34 and a third color separation element 35, and in addition, the outgoing light switching device 33 has a drive section 36 (see FIG. 9) although not shown in FIG. 7.

Configuration of Second Reflecting Element

Figure 8:
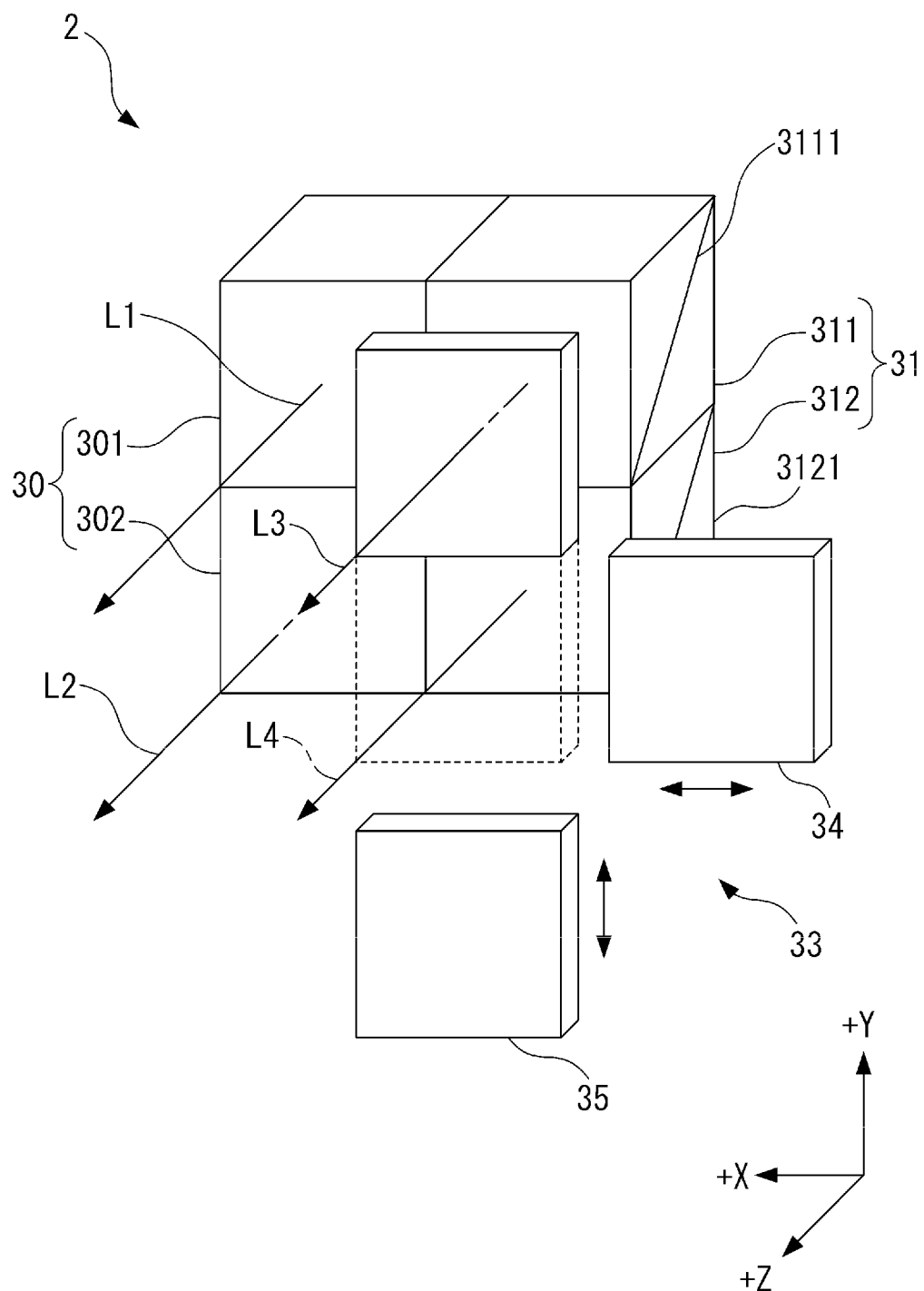
FIG. 8 is a diagram for explaining an arrangement of a second reflecting element and a third color separation element with respect to a reflecting prism of a second color separation element in the embodiment.

FIG. 8 is a diagram for explaining an arrangement of the second reflecting element 34 and the third color separation element 35 with respect to the reflecting prism 312 of the second color separation element 31. In other words, FIG. 8 is a diagram of a part of the light source device 2 viewed from the +Z direction.

As shown in FIG. 7 and FIG. 8, the second reflecting element 34 is disposed in a light path of the fourth colored light beam L4 emitted from the reflecting prism 312 so as to retractably be inserted. In the present embodiment, as shown in FIG. 8, the second reflecting element 34 is disposed on the −X direction side of the light path of the fourth colored light beam L4. Further, the second reflecting element 34 is switched by the drive section 36 described later between the state of being moved in the +X direction to be disposed in the light path of the fourth colored light beam L4, and the state of being moved in the −X direction to be disposed at a position outside the light path of the fourth colored light beam L4.

The second reflecting element 34 corresponds to a partial reflection element, and transmits a part of the incident light, and reflects the rest of the incident light. Specifically, the second reflecting element 34 transmits the incident light at a predetermined rate, and reflects the rest of the incident light. Therefore, when the second reflecting element 34 is inserted in the light path of the fourth colored light beam L4, a part of the yellow light beam YLs out of the yellow light beam YLs entering the second reflecting element 34 is transmitted through the second reflecting element 34, and is then emitted toward the +Z direction from the light source device 2 as the fourth colored light beam L4 to enter the homogenization device 4. In other words, the yellow light beam YLs is spatially separated from the blue light beam BLs, and is emitted from the fourth exit position S4 located at the −Y direction side of the third exit position S3, from which the blue light beam BLs is emitted in the light source device 2, as the fourth colored light beam L4 to enter the homogenization device 4.

In contrast, when the second reflecting element 34 is inserted in the light path of the fourth colored light beam L4, the rest of the yellow light beam YLs out of the yellow light beam YLs entering the second reflecting element 34 is reflected by the second reflecting element 34, and then enters the reflecting prism 312 once again. Then, the rest of the yellow light beam YLs having entered the reflecting prism 312 is reflected toward the +Y direction by the reflecting layer 3121, and then enters the wavelength conversion element 28 via the dichroic prism 311, the first polarization split element 22, the second polarization split element 23, and the second light collection element 27.

Here, the yellow phosphor included in the wavelength conversion element 28 hardly absorbs the yellow light beam having entered the wavelength conversion element 28 from the outside. Therefore, the yellow light beam YLs having entered the wavelength conversion element 28 is repeatedly reflected inside the wavelength conversion element 28 to thereby turn to the yellow light beam YLn as unpolarized light, and is then emitted outside the wavelength conversion element 28 together with the yellow light beam YLn generated in the yellow phosphor. Then, the yellow light beam YLn having been emitted from the wavelength conversion element 28 enters the second polarization split element 23 via the second light collection element 27 as described above.

In the present embodiment, the second reflecting element 34 is formed of a half mirror. The ratio between the light intensity of the yellow light beam YLs transmitted through the second reflecting element 34 and the light intensity of the yellow light beam YLs reflected by the second reflecting element 34 can be set in advance.

Configuration of Third Color Separation Element

The third color separation element 35 is disposed in a light path of the fourth colored light beam L4 emitted from the reflecting prism 312 so as to retractably be inserted. In the present embodiment, as shown in FIG. 8, the third color separation element 35 is disposed on the −Y direction side of the light path of the fourth colored light beam L4. Further, the third color separation element is switched by the drive section 36 described later between the state of being moved in the +Y direction to be disposed in the light path of the fourth colored light beam L4, and the state of being moved in the −Y direction to be disposed at a position outside the light path of the fourth colored light beam L4. In other words, in the light source device 2, there are three cases, namely when the second reflecting element 34 is disposed in the light path of the fourth colored light beam L4 emitted from the reflecting prism 312, when the third color separation element 35 is disposed in that light path, and when neither the second reflecting element 34 nor the third color separation element 35 is disposed in that light path.

The third color separation element 35 corresponds to a wavelength-selective reflection element, and has a property of transmitting the green light beam having entered the third color separation element 35 and reflecting the red light beam having entered the third color separation element 35. In other words, the third color separation element 35 transits the green light beam as light substantially the same in wavelength band as the green light beam GLs, which is emitted as the first colored light beam L1 from the light source device 2, and reflects the red light beam as light substantially the same in wavelength band as the red light beam RLs, which is emitted as the second colored light beam L2 from the light source device 2, toward the second color separation element 31.

Therefore, when the third color separation element 35 is inserted in the light path of the fourth colored light beam L4, the green light beam GLs included in the yellow light beam YLs entering the third color separation element 35 from the reflecting prism 312 is transmitted through the third color separation element 35, and is then emitted from the fourth exit position S4 as the fourth colored light beam L4 toward the homogenization device 4.

In contrast, when the third color separation element 35 is inserted in the light path of the fourth colored light beam L4, the red light beam RLs included in the yellow light beam YLs entering the third color separation element 35 from the reflecting prism 312 is reflected by the third color separation element 35, and then enters the reflecting prism 312 from the +Z direction. Further, the red light beam RLs enters the wavelength conversion element 28 via the second color separation element 31, the first polarization split element 22, the second polarization split element 23, and the second light collection element 27 similarly to the yellow light beam YLs reflected by the second reflecting element 34 in the light source device 2.

As described above, since the yellow phosphor included in the wavelength conversion element 28 hardly absorbs the yellow light beam having entered the wavelength conversion element 28 from the outside, the yellow phosphor does not absorb the red light beam RLs. Therefore, the red light beam RLs having entered the wavelength conversion element 28 is repeatedly reflected inside the wavelength conversion element 28 to thereby turn to a red light beam as unpolarized light, and is then emitted outside the wavelength conversion element 28 together with the yellow light beam YLn generated in the yellow phosphor.

Out of the red light beam emitted from the wavelength conversion element 28, the red light beam RLs as the s-polarized light is reflected by the third color separation element 35 to return to the wavelength conversion element 28, but the red light beam as the p-polarized light is transmitted through the second polarization split element toward the +Z direction, and by extension, emitted outside the light source device 2 from the second exit position S2 as the second colored light beam L2.

Such a third color separation element 35 is formed of a dichroic mirror in the present embodiment.

Configuration of Drive Section

Figure 9:
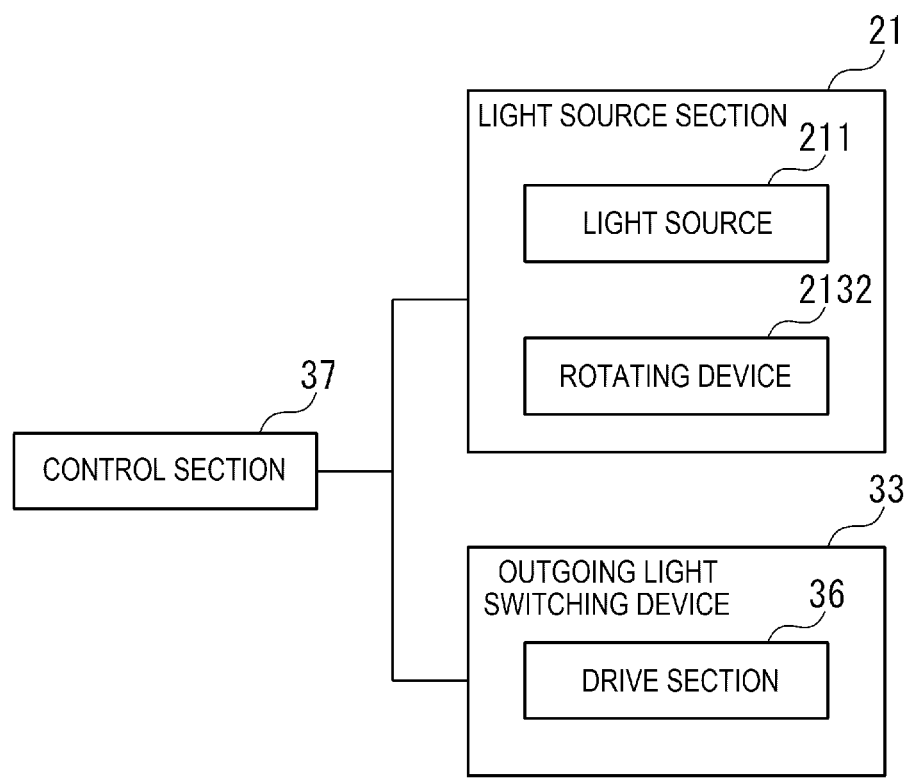
FIG. 9 is a block diagram showing a configuration of an outgoing light switching device and a control section in the embodiment.

FIG. 9 is a block diagram showing a configuration of the outgoing light switching device 33 and the control section 37.

As shown in FIG. 9, the outgoing light switching device 33 has the drive section 36.

The drive section 36 moves the second reflecting element 34 in the ±X directions to insert/retract the second reflecting element 34 to/from the light path of the fourth colored light beam L4 under the control by the control section 37. Further, the drive section 36 moves the third color separation element 35 in the ±Y directions to insert/retract the third color separation element 35 to/from the light path of the fourth colored light beam L4 under the control by the control section 37.

In other words, the state of the outgoing light switching device 33 in which the drive section 36 eliminates the second reflecting element 34 and the third color separation element 35 from the light path of the fourth colored light beam L4, and thus, the outgoing light switching device 33 emits the whole of the fourth colored light beam L4 corresponds to a first state. The state of the outgoing light switching device 33 in which the drive section 36 eliminates the third color separation element 35 from the light path of the fourth colored light beam L4, and inserts the second reflecting element 34 in the light path of the fourth colored light beam L4, and thus, the outgoing light switching device 33 emits a part of the fourth colored light beam L4 corresponds to a second state. The state of the outgoing light switching device 33 in which the drive section 36 eliminates the second reflecting element 34 from the light path of the fourth colored light beam L4, and inserts the third color separation element 35 in the light path of the fourth colored light beam L4, and thus, the outgoing light switching device 33 emits the green light beam as a colored light beam in the wavelength band of the first colored light beam L1 included in the fourth colored light beam L4 corresponds to a third state.

It should be noted that when the third color separation element 35 has the property of reflecting the green light beam while transmitting the red light beam, and the outgoing light switching device 33 is in the third state, the outgoing light switching device 33 emits the red light beam as the colored light beam in the wavelength band of the second colored light beam L2 included in the fourth colored light L4.

Configuration of Control Section

The control section 37 controls operations of the light source device 2. The control section 37 has a function of a mode control section and a function of a light intensity ratio control section.

For example, the control section 37 controls lighting of the light sources 211 constituting the light source section 21 to control the light intensity of the source light beam emitted from each of the light sources 211.

Further, for example, when the control section 37 functions as the mode control section, when an operation mode of the projector 1 is set in accordance with an operation by the user on an operation section not shown of the projector 1 and so on, the control section 37 controls the operations of the drive section 36 of the outgoing light switching device 33 in accordance with the operation mode thus set.

Specifically, when a power mode as a first mode is set by the user as the operation mode of the projector 1, the control section 37 makes the drive section 36 move the second reflecting element 34 in the −X direction to eliminate the second reflecting element 34 from the light path of the fourth colored light beam L4, and at the same time, move the third color separation element 35 in the −Y direction to eliminate the third color separation element 35 from the light path of the fourth colored light beam L4. In other words, the power mode as the first mode is a mode of switching the state of the outgoing light switching device 33 to the first state.

Thus, neither the second reflecting element 34 nor the third color separation element 35 is inserted in the light path of the fourth colored light beam L4, and the yellow light beam YLs entering the outgoing light switching device 33 from the reflecting prism 312 is directly emitted from the fourth exit position S4 as the fourth colored light beam L4. In other words, in the power mode, out of the yellow light beam YLn having been emitted from the wavelength conversion element 28, the yellow light beam YLs corresponding to the light intensity of a half of the yellow light beam YLn is emitted, and the green light beam GLs and the red light beam RLs corresponding to the light intensity of the other half of the yellow light beam YLn are emitted as the first colored light beam L1 and the second colored light beam L2, respectively.

Further, when a balance mode as a second mode is set by the user as the operation mode of the projector 1, the control section 37 makes the drive section 36 move the third color separation element 35 in the −Y direction to eliminate the third color separation element 35 from the light path of the fourth colored light beam L4, and then move the second reflecting element 34 in the +X direction to insert the second reflecting element 34 in the light path of the fourth colored light beam L4. In other words, the balance mode as the second mode is a mode of switching the state of the outgoing light switching device 33 to the second state.

Thus, the yellow light beam YLs corresponding to the light intensity obtained by multiplying the light intensity of a half of the yellow light beam YLn having been emitted from the wavelength conversion element 28 by a light transmission rate of the second reflecting element 34 is emitted from the light source device 2 as the fourth colored light beam L4. Further, the yellow light beam YLs having been reflected by the second reflecting element 34 returns to the wavelength conversion element 28. Thus, the light intensity of the green light beam GLs emitted from the light source device 2 as the first colored light beam L1 becomes higher than the light intensity of the green light beam GLs emitted as the first colored light beam L1 when the operation mode is the power mode. Similarly, the light intensity of the red light beam RLs emitted from the light source device 2 as the second colored light beam L2 becomes higher than the light intensity of the red light beam RLs emitted as the second colored light beam L2 when the operation mode is the power mode.

Further, when a color gamut preference mode as a third mode is set by the user as the operation mode of the projector 1, the control section 37 makes the drive section 36 move the second reflecting element 34 in the −X direction to eliminate the second reflecting element 34 from the light path of the fourth colored light beam L4, and at the same time, move the third color separation element 35 in the +Y direction to insert the third color separation element 35 in the light path of the fourth colored light beam L4. In other words, the color gamut preference mode as the third mode is a mode of switching the state of the outgoing light switching device 33 to the third state.

Thus, the green light beam GLs included in the light intensity of a half of the yellow light beam YLn emitted from the wavelength conversion element 28 is emitted from the light source device 2 as the fourth colored light beam L4. Further, the red light beam RLs having been reflected by the third color separation element 35 returns to the wavelength conversion element 28. Thus, the light intensity of the red light beam RLs emitted from the light source device 2 as the second colored light beam L2 becomes higher than the light intensity of the red light beam RLs emitted as the second colored light beam L2 when the operation mode is the balance mode. It should be noted that the light intensity of the green light beam GLs emitted from the light source device 2 as the first colored light beam L1 is the same as the light intensity of the green light beam GLs emitted as the first colored light beam L1 when the operation mode is the power mode.

Here, in the operation modes described above, the light intensity of the blue light beam BLs emitted from the light source device 2 as the third colored light beam L3 is the same. The proportion of the light intensity of the blue light beam BLs to the light intensity of the light beams emitted from the light source device 2 in each of the operation modes is determined by the control section 37 controlling the rotational angle of the retardation element 2131 of the rotary retardation device 213. In other words, when the control section 37 functions as the light intensity ratio control section, the control section 37 controls the operation of the rotary retardation device 213 in accordance with the operation mode thus set.

It should be noted that the light intensity of the light beams emitted from the light source device 2 is a sum of the light intensity of the first colored light beam L1, the light intensity of the second colored light beam L2, the light intensity of the third colored light beam L3, and the light intensity of the fourth colored light beam L4.

Specifically, the control section 37 operates the rotating device 2132 in accordance with the operation mode thus set to control the rotational angle of the retardation element 2131 as the fourth retardation element, and thus controls the ratio between the blue light beam BLp as the first polarization component and the blue light beam BLs as the second polarization component in the source light beams entering the first polarization split element 22 from the retardation element 2131.

As described above, due to the control section 37, the ratio between the blue light beam BLp and the blue light beam BLs entering the first polarization split element 22, namely the ratio between the blue light beam BLp entering the first reflecting element 26 and the blue light beam BLp entering the wavelength conversion element 28, is controlled, and by extension, the ratio between the blue light beam BLp reflected by the first reflecting element 26 and the yellow light beam YLn generated in the wavelength conversion element 28 is controlled.

Thus, it is possible to control the ratio between the total light intensity of the green light beam GLs as the first colored light beam L1, the red light beam RLs as the second colored light beam L2, and the yellow light beam YLs or the green light beam GLs as the fourth colored light beam, and the light intensity of the blue light beam BLs as the third colored light beam L3 out of the light beams emitted from the light source device 2.

Advantages of Embodiment

According to the projector 1 related to the present embodiment described hereinabove, the following advantages can be exerted.

When defining the first direction as the +Z direction, the second direction as the −Y direction, and the third direction as the −X direction, wherein the second direction and the third direction are two directions perpendicular to the first direction and perpendicular to each other, the light source device 2 emits the light beams toward the +Z direction. The light source device 2 emits the first colored light beam L1 emitted from the first exit position S1, the second colored light beam L2 which is emitted from the second exit position S2 located at the −Y direction side of the first exit position S1, and is the light longer in wavelength than the first colored light beam L1, the third colored light beam L3 which is emitted from the third exit position S3 located at the −X direction side of the first exit position S1, and is the light shorter in wavelength than the first colored light beam L1, and the fourth colored light beam L4 emitted from the fourth exit position S4 located at the −Y direction side of the third exit position S3. It should be noted that in the present embodiment described above, the light source device 2 emits the green light beam GLs as the first colored light beam L1, emits the red light beam RLs as the second colored light beam L2, and emits the blue light beam BLs as the third colored light beam L3.

In the light path of the fourth colored light beam L4, there is disposed the outgoing light switching device 33, and the yellow light beam YLs as the mixed light beam including the light beam in the wavelength band of the green light beam GLs as the first colored light beam L1 and the light beam in the wavelength band of the red light beam RLs as the second colored light beam enters the outgoing light switching device 33. The outgoing light switching device 33 switches between the first state of emitting the whole of the yellow light beam YLs entering the outgoing light switching device 33, the second state of emitting a part of the yellow light beam YLs entering the outgoing light switching device 33, and the third state of emitting the green light beam GLs as the colored light beam in the wavelength band of the first colored light beam L1 included in the yellow light beam YLs entering the outgoing light switching device 33. It should be noted that, as described above, when the third color separation element 35 has the property of reflecting the green light beam while transmitting the red light beam, the third state is the state in which the outgoing light switching device 33 emits the red light beam RLs as the colored light beam in the wavelength band of the second colored light beam L2 included in the yellow light beam YLs entering the outgoing light switching device 33.

According to such a configuration, it is possible to switch the light source device 2 between when emitting the yellow light beam YLs as the fourth colored light beam L4 in addition to the green light beam GLs as the first colored light beam L1, the red light beam RLs as the second colored light beam L2, and the blue light beam BLs as the third colored light beam L3, when emitting a part of the yellow light beam YLs, and when emitting the green light beam GLs, which is the colored light beam in the wavelength band of the first colored light beam L1 included in the yellow light beam YLs, as the fourth colored light beam L4. Therefore, it is possible to switch the colored light beams to be emitted from the light source device 2 in accordance with the intended use of the light source device 2.

The outgoing light switching device 33 has the second reflecting element 34 as the partial reflection element, and the third color separation element 35 as the wavelength-selective reflection element. The second reflecting element 34 is disposed so as to retractably be inserted in the light path of the fourth colored light beam L4, reflects a part of the yellow light beam YLs as the mixed light beam entering the second reflecting element 34, and emits another part of the yellow light beam YLs as the fourth colored light beam L4. The third color separation element 35 is disposed so as to retractably be inserted in the light path of the fourth colored light beam L4, transmits the green light beam GLs as one of the colored light beam in the wavelength band of the first colored light beam L1 included in the yellow light beam YLs as the mixed light beam entering the third color separation element 35, and the colored light beam in the wavelength band of the second colored light beam L2 included in the yellow light beam YLs as the mixed light beam entering the third color separation element 35, and reflects the red light beam RLs as the other thereof to thereby emit the green light beam GLs as the fourth colored light beam L4.

According to such a configuration, by inserting/retracting the second reflecting element 34 in/from the light path of the fourth colored light beam L4, it is possible to switch between when the yellow light beam YLs having entered the outgoing light switching device 33 is directly emitted as the fourth colored light beam L4, and when the yellow light beam YLs corresponding to a part of the light intensity of the yellow light beam YLs having entered the outgoing light switching device 33 is emitted as the fourth colored light beam L4.

Further, by inserting/retracting the third color separation element 35 in/from the light path of the fourth colored light beam L4, it is possible to switch between when the yellow light beam YLs having entered the outgoing light switching device 33 is directly emitted as the fourth colored light beam L4, and when the green light beam GLs as the light beam in the wavelength band of the first colored light beam L1 included in the yellow light beam YLs having entered the outgoing light switching device 33 is emitted as the fourth colored light beam L4.

Therefore, it is possible to switch the colored light beams to be emitted by the light source device 2 as the fourth colored light L4.

It should be noted that as described above, it is also possible to exert substantially the same advantages as described above when the third color separation element 35 has a configuration of reflecting the green light beam GLs as the one of the colored light beam in the wavelength band of the first colored light beam L1 included in the yellow light beam YLs as the mixed light beam entering the third color separation element 35, and the colored light beam in the wavelength band of the second colored light beam L2 included in the yellow light beam YLs as the mixed light beam entering the third color separation element 35, and transmitting the red light beam RLs as the other thereof to thereby emit the red light beam RLs as the fourth colored light beam L4.

The second reflecting element 34 is a half mirror for transmitting the yellow light beam YLs entering the second reflecting element 34 at a predetermined rate. The third color separation element 35 is a dichroic mirror for transmitting the green light beam GLs as the light beam in the wavelength band of the first colored light beam L1 included in the yellow light beam YLs entering the third color separation element 35 while reflecting the red light beam RLs as the light beam in the wavelength band of the second colored light beam L2.

According to such a configuration, it is possible to easily configure the second reflecting element 34 as the partial reflection element, and the third color separation element 35 as the wavelength-selective reflection element.

It should be noted that as described above, the third color separation element 35 can be a dichroic mirror for reflecting the green light beam GLs and transmitting the red light beam RLs.

The light source device 2 is provided with the control section 37. The outgoing light switching device 33 is provided with the second reflecting element 34, the third color separation element 35, and the drive section 36 for retractably inserting each of the second reflecting element 34 and the third color separation element 35 in the light path of the fourth colored light beam L4.

The control section 37 has a function as the mode control section for controlling the operations of the drive section 36 in accordance with the operation mode. When the power mode as the first mode for setting the outgoing light switching device 33 in the first state is set as the operation mode, the control section 37 makes the drive section 36 eliminate the second reflecting element 34 and the third color separation element 35 from the light path of the fourth colored light beam L4. When the balance mode as the second mode for setting the outgoing light switching device 33 in the second state is set as the operation mode, the control section 37 makes the drive section 36 eliminate the third color separation element 35 from the light path of the fourth colored light beam L4, and insert the second reflecting element 34 in the light path of the fourth colored light beam L4. When the color gamut preference mode as the third mode for setting the outgoing light switching device 33 in the third state is set as the operation mode, the control section 37 makes the drive section 36 eliminate the second reflecting element 34 from the light path of the fourth colored light beam L4, and insert the third color separation element 35 in the light path of the fourth colored light beam L4.

According to such a configuration, by the control section 37 controlling the drive section 36 in accordance with the operation mode thus set, it is possible to switch the colored light beam to be emitted from the light source device 2 as the fourth colored light beam L4. Therefore, it is possible, by switching the operation mode, to switch the colored light beam to be emitted as the fourth colored light beam L4 from the light source device 2 without manually moving the second reflecting element 34 and the third color separation element 35.

The light source device 2 is provided with the light source section 21, the first polarization split element 22, the second polarization split element 23, the first retardation element 24, the first reflecting element 26, the wavelength conversion element 28, the second retardation element 29, the first color separation element 30, the second color separation element 31, and the third retardation element 32 in addition to the outgoing light switching device 33.

The light source section 21 emits the source light beams. The first polarization split element 22 transmits the blue light beam BLp as the first polarization component of the source light beams toward the +X direction, and reflects the blue light beam BLs as the second polarization component of the source light beams toward the −Z direction out of the source light beams entering the first polarization split element 22 along the +X direction. The second polarization split element 23 is located at the +X direction side of the first polarization split element 22, and reflects the blue light beam BLp, which enters the second polarization split element 23 in the +X direction, toward the −Z direction. The first reflecting element 26 is located at the −Z direction side of the first polarization split element 22, and reflects the blue light beam BLs entering the first reflecting element 26 toward the +Z direction. The first retardation element 24 is located between the first polarization split element 22 and the first reflecting element 26 in the +Z direction, and converts the polarization component of the source light beam entering the first retardation element 24. The wavelength conversion element 28 is located at the −Z direction side of the second polarization split element 23, and emits the unpolarized converted light beam, which is obtained by performing the wavelength conversion on the blue light beam BLp entering the wavelength conversion element 28 in the −Z direction, toward the +Z direction. The second retardation element 29 is the ½ wave plate which is located at the +Z direction side of the second polarization split element 23, and which the converted light beam having been transmitted through the second polarization split element 23 enters. The first color separation element 30 is located at the +Z direction side of the second retardation element 29, and separates the converted light beam entering the first color separation element 30 from the second retardation element 29 into the first colored light beam L1 and the second colored light beam L2. The second color separation element 31 is located at the +Z direction side of the first polarization split element 22, and separates the light beam entering the second color separation element 31 in the +Z direction from the first polarization split element 22 into the third colored light beam L3 and the fourth colored light beam L4. The third retardation element 32 is the ½ wave plate which is located in the light path of the third colored light beam L3 separated by the second color separation element 31, and is configured to convert the blue light beam BLp entering the ½ wave plate into the blue light beam BLs.

The second polarization split element 23 transmits the yellow light beam YLp as the first polarization component of the converted light beam out of the converted light beam, which enters the second polarization split element 23 in the +Z direction, toward the +Z direction to enter the second retardation element 29. The second polarization split element 23 reflects the yellow light beam YLs as the second polarization component of the converted light beam toward the −X direction.

The first polarization split element 22 transmits the blue light beam BLp as the first polarization component of the source light beam, which enters the first polarization split element 22 in the +Z direction, toward the +Z direction to enter the second color separation element 31. The first polarization split element 22 reflects the yellow light beam YLs, which enters the first polarization split element 22 in the −X direction, toward the +Z direction to enter the second color separation element 31.

The first color separation element 30 emits the green light beam GLs as the first color component included in the yellow light beam YLs entering the first color separation element 30 from the second retardation element 29 as the first colored light beam L1. The first color separation element 30 emits the red light beam RLs as the second color component included in the yellow light beam YLs as the second colored light beam L2.

The second color separation element 31 emits the blue light beam BLp as the first polarization component of the source light beam entering the second color separation element 31 from the first polarization split element 22 to the third retardation element 32 as the third colored light beam L3. The second color separation element 31 emits the yellow light beam YLs as the second polarization component of the converted light beam entering the second color separation element 30 from the first polarization split element 22 as the fourth colored light beam L4.

The outgoing light switching device 33 is disposed in the light path of the fourth colored light beam L4 separated by the second color separation element 31.

According to such a configuration, it is possible to uniform the green light beam as the first colored light beam L1, the red light beam as the second colored light beam L2, the blue light beam as the third colored light beam L3, and the yellow light beam or the green light beam as the fourth colored light beam emitted from the light source device 2 to the linearly polarized light beams the same as each other. Therefore, there is no need to provide the light source device 2 to be adopted in the projector 1 with a polarization conversion element for uniforming the polarization directions of the incident light beams and then emitting the result. Therefore, it is possible to achieve reduction in size of the light source device 2, and by extension, the projector 1.

The light source device 2 has the control section 37 functioning as the light intensity ratio control section. The light source section 21 is provided with the light sources 211, the retardation element 2131 as the fourth retardation element for converting a part of the blue light beams BLs having been emitted from the light sources 211 into the blue light beam BLp, and the rotating device 2132 for rotating the retardation element 2131. The control section 37 controls the rotational angle of the retardation element 2131 by the rotating device 2132 to control the ratio between the first polarization component and the second polarization component in the source light beams which are emitted from the retardation element 2131 and then enter the first polarization split element 22, namely the ratio between the blue light beam BLp and the blue light beam BLs.

According to such a configuration, as described above, it is possible to control the balance between the light intensity of the three colored light beams, namely the green light beam GLs as the first colored light beam L1, the red light beam RLs as the second colored light beam L2, and the yellow light beam YLs or the green light beam GLs as the fourth colored light beam, and the light intensity of the blue light beam BLs emitted as the third colored light beam L3. Therefore, it is possible to improve the general versatility of the light source device 2.

The illumination optical device 10 is provided with the light source device 2 and the homogenization device 4. The homogenization device 4 has the two multi-lenses 41, 42 for dividing the light beams entering the multi-lens 41 from the light source device 2 into the plurality of partial light beams, and the superimposing lens 43 for superimposing the plurality of partial light beams entering the superimposing lens 43 from the two multi-lenses 41, 42 on the predetermined position.

According to such a configuration, it is possible to exert substantially the same advantages as those of the light source device 2 described above, and in addition, it is possible to homogenize the illuminance in the predetermined position described above.

The projector 1 is provided with the illumination optical device 10, the light modulation device 6 for modulating the light beams emitted from the illumination optical device 10, and the projection optical device 7 for projecting the light beams modulated by the light modulation device 6. The light modulation device 6 is disposed at the predetermined position described above.

According to such a configuration, it is possible to obtain substantially the same advantages as those of the illumination optical device 10 described above. Further, by disposing the light modulation device 6 at the position on which the plurality of partial light beams of the colored light beams L1 through L4 is superimposed by the superimposing lens 43, it is possible to homogenously illuminate the light modulation device 6. Therefore, it is possible to prevent the luminance variation from occurring in the image which is formed by the light modulation device 6 and is then projected by the projection optical device 7.

The light modulation device 6 is provided with the single liquid crystal panel 61 having the plurality of pixels PX, and the microlens array 62 which is located at the light incident side of the liquid crystal panel 61, and has the plurality of microlenses 621 corresponding to the plurality of pixels PX.

The pixels PX each have the first sub-pixel SX1, the second sub-pixel SX2, the third sub-pixel SX3, and the fourth sub-pixel SX4.

The plurality of microlenses 621 makes the first colored light beam L1 enter the first sub-pixels SX1, the second colored light beam L2 enter the second sub-pixels SX2, the third colored light beam L3 enter the third sub-pixels SX3, and the fourth colored light beam L4 enter the fourth sub-pixels SX4.

According to such a configuration, due to the microlenses 621, it is possible to make the plurality of colored light beams L1 through L4 entering the light modulation device 6 enter the corresponding sub-pixels SX of the pixels PX in the liquid crystal panel 61. Therefore, it is possible to make the colored light beams L1 through L4 emitted from the light source device 2 efficiently enter the sub-pixels SX, and thus, it is possible to increase the use efficiency of the colored light beams L1 through L4.

Modifications of Embodiment

The present disclosure is not limited to the embodiment described above, but includes modifications, improvements, and so on in the range where the advantages of the present disclosure can be achieved.

In the embodiment described above, it is assumed that the light source device 2 emits the green light beam GLs as the first colored light beam L1, emits the red light beam RLs as the second colored light beam L2, emits the blue light beam BLs as the third light beam L3, and emits one of the yellow light beam YLs and the green light beam GLs as the fourth colored light beam L4. However, the first through fourth colored light beams L1 through L4 emitted by the light source devices 2 are not limited to these colored light beams. For example, the first colored light beam L1 is not required to be the green light beam, the second colored light beam L2 is not required to be the red light beam providing the second colored light beam L2 is longer in wavelength than the first colored light beam L1, and the third colored light beam L3 is not required to be the blue light beam providing the third colored light beam L3 is shorter in wavelength than the first colored light beam L1. Further, the fourth colored light beam L4 is not required to be the yellow light beam, but can also be the red light beam instead of the green light beam as described above.

Further, the colored light beams emitted by the light source device 2 are not required to be the colored light beams as the s-polarized light. For example, the first through fourth colored light beams L1 through L4 can be the p-polarized light, or it is possible to use the s-polarized light as at least one of the first through fourth colored light beams L1 through L4, and use the p-polarized light as the rest of the colored light beams.

In the embodiment described above, the +Z direction in which the light source device 2 emits the light beams is defined as the first direction, and the −Y direction and the +X direction as the two directions perpendicular to the +Z direction and perpendicular to each other are defined as the second direction and the third direction, respectively. Further, the +Y direction as the opposite direction to the −Y direction is defined as the upper direction in the projector 1. However, this is not a limitation, but the second direction can be the +Y direction, and the third direction can be the −X direction. Further, the second direction can be either of the +X direction and the −X direction, and the third direction can be either of the +Y direction and the −Y direction. In other words, as long as the second direction and the third direction are perpendicular to the first direction, and are perpendicular to each other, the orientation of the second direction and the third direction can arbitrarily be changed.

In the embodiment described above, it is assumed that the outgoing light switching device 33 has the second reflecting element 34 as the partial reflection element, and the third color separation element 35 as the wavelength-selective reflection element. However, this is not a limitation, it is possible to provide the outgoing light switching device 33 with a configuration in which one of the partial reflection element and the wavelength-selective reflection element is not provided. Further, the configuration of the outgoing light switching device 33 is not limited to the above, but can arbitrarily be changed providing it is possible to switch between when either one of the mixed light beam of a part of the light intensity of the mixed light beam entering the outgoing light switching device 33 and the colored light beam in a part of the wavelength band included in the mixed light beam entering the outgoing light switching device 33 is emitted as the fourth colored light beam L4, and when the mixed light beam described above entering the outgoing light switching device 33 is emitted as the fourth colored light beam L4.

In the embodiment described above, it is assumed that the second reflecting element 34 as the partial reflection element is a half mirror, and the third color separation element 35 as the wavelength-selective reflection element is a dichroic mirror. However, this is not a limitation, but another configuration can be adopted as the configuration of the partial reflection element and the wavelength-selective reflection element providing the respective functions can be realized. For example, the third color separation element 35 can be a dichroic prism.

In the embodiment described above, it is assumed that the outgoing light switching device 33 has the drive section 36 for retractably inserting the second reflecting element 34 and the third color separation element 35 in the light path of the fourth colored light beam L4. Further, it is assumed that the control section 37 drives the drive section 36 in accordance with the operation mode set to thereby switch between when one of the second reflecting element 34 and the third color separation element 35 is inserted in the light path of the fourth colored light beam L4, and when each of the second reflecting element 34 and the third color separation element 35 is eliminated from the light path of the fourth colored light beam L4. However, this is not a limitation, and it is possible for the user to manually insert/retract the second reflecting element 34 and the third color separation element 35. On this occasion, it is also possible to adopt a configuration in which the second reflecting element 34 and the third color separation element 35 are inserted in/retracted from the fourth colored light beam L4 by driving the drive section 36 in accordance with the operation by the user.

In the embodiment described above, it is assumed that when the second reflecting element 34 is eliminated from the light path of the fourth colored light beam L4, the second reflecting element 34 is located at the −X direction side of the light path of the fourth colored light beam L4. It is assumed that when the third color separation element 35 is eliminated from the light path of the fourth colored light beam L4, the third color separation element 35 is located at the −Y direction side of the light path of the fourth colored light beam L4. However, this is not a limitation, when the second reflecting element 34 is eliminated from the light path of the fourth colored light beam L4, the second reflecting element 34 can be located at the −Y direction side of the light path of the fourth colored light beam L4, and when the third color separation element 35 is eliminated from the light path of the fourth colored light beam L4, the third color separation element 35 can be located at the −X direction side of the light path of the fourth colored light beam L4. Further, the second reflecting element 34 and the third color separation element 35 can be disposed so as to overlap the position at the −X direction side or the −Y direction side of the light path of the fourth colored light beam L4.

In other words, it is sufficient for the second reflecting element 34 and the third color separation element 35 to be disposed at a position not overlapping the light path of the first colored light beam L1, the light path of the second colored light beam L2, and the light path of the third colored light beam L3.

In the embodiment described above, the configuration of the light source device 2 is referred to in the drawings (in particular in FIGS. 4 through 6) described above, but the configuration of the light source device to which the present disclosure can be applied is not limited to the configuration described above. In other words, the present disclosure can be applied to any light source devices for emitting the first through fourth colored light beams spatially separated from each other.

For example, it is assumed that the light source section 21 emits the blue light beams BLs, BLp in the +X direction. However, this is not a limitation, and it is also possible that the light sources 211 emit the blue light beams BLs, BLp in a direction crossing the +X direction, and the blue light beams BLs, BLp are reflected toward the +X direction by a reflecting member so as to enter the first polarization split element 22 in the +X direction.

Further, it is assumed that the light source device 2 has the chassis CA as the light source device chassis. However, this is not a limitation, and the chassis CA can be eliminated. In this case, it is sufficient to define an imaginary orthogonal plane with respect to the +Z direction in which the light source device emits the colored light beams as the exit surface, and define the positions at which the first through fourth colored light beams pass through the imaginary orthogonal plane as the first through fourth exit positions.

In the embodiment described above, it is assumed that the control section 37 functioning as the light intensity ratio control section controls the rotating device 2132 in accordance with the operation mode thus set to control the rotational angle of the retardation element 2131 as the fourth retardation element to thereby control the ratio between the blue light beam BLp and the blue light beam BLs emitted from the retardation element 2131. However, this is not a limitation, and the light intensity ratio control section and the rotating device can be eliminated. Further, it is also possible to adopt a configuration in which the rotational angle of the retardation element 2131 is controlled by the drive of the rotating device in accordance with the operation by the user.

In the embodiment described above, it is assumed that the projector is provided with the homogenization device 4 having the multi-lenses 41, 42 and the superimposing lens 43. However, this is not a limitation, and the homogenization device 4 can be eliminated. In this case, it is possible to provide a homogenization device having another configuration.

In the embodiment described above, it is assumed that the light source device 2 is for emitting the light beams which enter the light modulation device 6 having the liquid crystal panel 61 and the microlens array 62. However, this is not a limitation, and the configuration of the light modulation device illuminated by the light source device according to the present disclosure is not limited to the above. The same applies to the illumination optical device 10.

Further, the light source device according to the present disclosure is not limited to the light source device adopted in the projector, but can be a device to be used for other purposes.

What is claimed is:

1. A light source device configured to emit a light beam in a first direction, comprising:
   a first exit position from which a first colored light beam is emitted;
   a second exit position which is located at a second direction side of the first exit position, and from which a second colored light beam longer in wavelength than the first colored light beam is emitted;
   a third exit position which is located at a third direction side of the first exit position, and from which a third colored light beam shorter in wavelength than the first colored light beam is emitted;
   a fourth exit position which is located at the second direction side of the third exit position, and from which a fourth colored light beam is emitted; and
   an outgoing light switching device which is disposed in a light path of the fourth colored light beam, and switches a light beam to be emitted as the fourth colored light beam, wherein
   the second direction and the third direction are perpendicular to the first direction, and are perpendicular to each other,
   a mixed light beam including a light beam in a wavelength band of the first colored light beam and a light beam in a wavelength band of the second colored light beam enters the outgoing light switching device, and
   the outgoing light switching device switches between a first state of emitting a whole of the mixed light beam entering the outgoing light switching device, a second state of emitting a part of the mixed light beam entering the outgoing light switching device, and a third state of emitting either one of a colored light beam in the wavelength band of the first colored light beam included in the mixed light beam entering the outgoing light switching device and a colored light beam in the wavelength band of the second colored light beam included in the mixed light beam entering the outgoing light switching device.

2. The light source device according to claim 1, wherein the outgoing light switching device includes at least either one of a partial reflection element and a wavelength-selective reflection element,
   the partial reflection element is disposed so as to retractably be inserted in the light path of the fourth colored light beam, reflects a part of the mixed light beam entering the partial reflection element, and emits another part of the mixed light beam entering the partial reflection element as the fourth colored light beam, and
   the wavelength-selective reflection element is disposed so as to retractably be inserted in the light path of the fourth colored light beam, transmits one colored light beam out of a colored light beam in the wavelength band of the first colored light beam included in the mixed light beam entering the wavelength-selective reflection element and a colored light beam in the wavelength band of the second colored light beam included in the mixed light beam entering the wavelength-selective reflection element, and reflects the other colored light beam to thereby emit the one colored light beam as the fourth colored light beam.

3. The light source device according to claim 2, wherein
the partial reflection element is a half mirror configured to transmit the mixed light beam entering the partial reflection element at a predetermined rate, and
the wavelength-selective reflection element is a dichroic mirror configured to transmit the one colored light beam and reflect the other colored light beam.

4. The light source device according to claim 2, further comprising:
a mode control section, wherein
the outgoing light switching device includes
the partial reflection element,
the wavelength-selective reflection element, and
a drive section configured to retractably insert the partial reflection element and the wavelength-selective reflection element in the light path of the fourth colored light beam, and
the mode control section makes the drive section
eliminate the partial reflection element and the wavelength-selective reflection element from the light path of the fourth colored light beam when a first mode of setting the outgoing light switching device in the first state is set as an operation mode,
eliminate the wavelength-selective reflection element from the light path of the fourth colored light beam and insert the partial reflection element in the light path of the fourth colored light beam when a second mode of setting the outgoing light switching device in the second state is set as the operation mode, and
eliminate the partial reflection element from the light path of the fourth colored light beam and insert the wavelength-selective reflection element in the light path of the fourth colored light beam when a third mode of setting the outgoing light switching device in the third state is set as the operation mode.

5. The light source device according to claim 1, further comprising:
a light source section configured to emit a source light beam;
a first polarization split element configured to transmit a first polarization component of the source light beam in the third direction, and reflect a second polarization component of the source light beam in an opposite direction to the first direction out of the source light beam entering the first polarization split element along the third direction;
a second polarization split element located at the third direction side of the first polarization split element, and configured to reflect the first polarization component of the source light beam entering the second polarization split element in the third direction toward the opposite direction to the first direction;
a first reflecting element located in the opposite direction side to the first direction side of the first polarization split element, and configured to reflect the source light beam entering the first reflecting element toward the first direction;
a first retardation element located between the first polarization split element and the first reflecting element in the first direction, and configured to convert a polarization component of the source light beam;
a wavelength conversion element located at the opposite direction side to the first direction side of the second polarization split element, and configured to emit a converted light beam as unpolarized light, which is obtained by performing wavelength conversion on the first polarization component of the source light beam entering the wavelength conversion element in the opposite direction to the first direction, toward the first direction;
a second retardation element which is a ½ wave plate which is located at the first direction side of the second polarization split element, and which the converted light beam transmitted through the second polarization split element enters;
a first color separation element located at the first direction side of the second retardation element, and configured to separate the converted light entering the first color separation element from the second retardation element into the first colored light beam and the second colored light beam;
a second color separation element located at the first direction side of the first polarization split element, and configured to separate a light beam entering the second color separation element in the first direction from the first polarization split element into the third colored light beam and the fourth colored light beam; and
a third retardation element which is a ½ wave plate located in a light path of the third colored light beam separated by the second color separation element, wherein
the second polarization split element transmits the first polarization component of the converted light beam in the first direction to thereby make the first polarization component enter the second retardation element, and reflects the second polarization component of the converted light beam toward an opposite direction to the third direction out of the converted light beam entering the second polarization split element in the first direction,
the first polarization split element transmits the first polarization component of the source light beam entering the first polarization split element in the first direction toward the first direction to thereby make the first polarization component enter the second color separation element, and reflects the second polarization component of the source light beam entering the first polarization split element in the opposite direction to the third direction toward the first direction to thereby make the second polarization component enter the second color separation element,
the first color separation element emits a first color component included in the second polarization component of the converted light beam entering the first color separation element from the second retardation element as the first colored light beam, and emits a second color component included in the second polarization component of the converted light beam as the second colored light beam,
the second color separation element emits the first polarization component of the source light beam entering the second color separation element from the first polarization split element to the third retardation element as the third colored light beam, and emits the second polarization component of the converted light beam entering the second color separation element from the first polarization split element as the fourth colored light beam, and
the outgoing light switching device is disposed in the light path of the fourth colored light beam separated by the second color separation element.

6. The light source device according to claim 5, further comprising:
a light intensity ratio control section, wherein
the light source section includes
a light source,
a fourth retardation element configured to convert a part of the second polarization component of the source light beam emitted from the light source into the first polarization component of the source light beam, and
a rotating device configured to rotate the fourth retardation element, and
the light intensity ratio control section controls a rotational angle of the fourth retardation element by the rotating device to control a ratio between the first polarization component and the second polarization component in the source light beam emitted from the fourth retardation element.

7. An illumination optical device comprising:
the light source device according to claim 1; and
a homogenization device, wherein
the homogenization device includes
a pair of multi-lenses configured to divide the light beam entering the pair of multi-lenses from the light source device into a plurality of partial light beams, and
a superimposing lens configured to superimpose the plurality of partial light beams entering the superimposing lens from the pair of multi-lenses on a predetermined position.

8. A projector comprising:
the illumination optical device according to claim 7;
a light modulation device configured to modulate light emitted from the illumination optical device; and
a projection optical device configured to project the light beam modulated by the light modulation device, wherein
the light modulation device is disposed at the predetermined position.

9. The projector according to claim 8, wherein
the light modulation device includes
a single liquid crystal panel having a plurality of pixels, and
a microlens array which is located at a light incident side of the liquid crystal panel, and has a plurality of microlenses corresponding to the plurality of pixels,
the pixels each include a first sub-pixel, a second sub-pixel, a third sub-pixel, and a fourth sub-pixel, and
the plurality of microlenses makes
the first colored light beam enter the first sub-pixels,
the second colored light beam enter the second sub-pixels,
the third colored light beam enter the third sub-pixels, and
the fourth colored light beam enter the fourth sub-pixels.

* * * * *